United States Patent
Kunihiro et al.

(10) Patent No.: US 10,469,689 B2
(45) Date of Patent: Nov. 5, 2019

(54) READING CONTROL APPARATUS, CONTROL METHOD, AND STORAGE MEDIUM

(71) Applicant: CANON KABUSHIKI KAISHA, Tokyo (JP)

(72) Inventors: Syunichi Kunihiro, Kawasaki (JP); Shigeki Hachiro, Yokohama (JP); Toshiyuki Kuroda, Yokohama (JP); Kaede Furuichi, Kawasaki (JP); Tomofumi Nishida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 61 days.

(21) Appl. No.: 15/786,033

(22) Filed: Oct. 17, 2017

(65) Prior Publication Data

US 2018/0115671 A1  Apr. 26, 2018

(30) Foreign Application Priority Data

Oct. 24, 2016  (JP) .................. 2016-208186

(51) Int. Cl.
  *H04N 1/04*  (2006.01)
  *H04N 1/00*  (2006.01)
  *H04N 1/40*  (2006.01)

(52) U.S. Cl.
  CPC ..... *H04N 1/00822* (2013.01); *H04N 1/00809* (2013.01); *H04N 1/00816* (2013.01); *H04N 1/00824* (2013.01); *H04N 1/00827* (2013.01); *H04N 1/40056* (2013.01); *H04N 2201/0094* (2013.01); *H04N 2201/0098* (2013.01); *H04N 2201/0438* (2013.01)

(58) Field of Classification Search
  CPC .......... H04N 1/00822; H04N 1/00809; H04N 1/00816; H04N 1/00824; H04N 1/00827;
  (Continued)

(56) References Cited

U.S. PATENT DOCUMENTS 9,058,531 B2 *  6/2015  Slutsky ............. G06K 7/10732
2004/0190080 A1 *  9/2004  Kodama ............ H04N 1/00129
                                                              358/474

(Continued)

FOREIGN PATENT DOCUMENTS

CN  101751903 A  6/2010
CN  103873717 A  6/2014
(Continued)

*Primary Examiner* — Cheukfan Lee
(74) *Attorney, Agent, or Firm* — Canon U.S.A., Inc. IP Division

(57) ABSTRACT

A reading control apparatus is directed to improving convenience for a user when a reading device is caused to read a display surface of a terminal apparatus having the function of changing the size of an image to be displayed on a display device, and includes a reading unit configured to cause the reading device to read, as a reading target, the display surface, which is a surface including the display device of the terminal apparatus operating in either of a first state where an image in a first size is displayed on the display device, and a second state where the image in a second size smaller than the first size is displayed on the display device, thereby acquiring image data, and a notification unit configured to, in a case where the terminal apparatus placed on a document platen is not in the first state, execute a notification process.

18 Claims, 18 Drawing Sheets

(58) Field of Classification Search
CPC ....... H04N 1/40056; H04N 2201/0094; H04N 2201/0098; H04N 2201/0438; H04N 1/00774; H04N 1/00755; H04N 1/00758; H04N 1/00766; H04N 1/00771; H04N 1/00076; H04N 1/0476
USPC ................................ 358/497, 474, 475, 509
See application file for complete search history.

(56) References Cited

U.S. PATENT DOCUMENTS

| | | | |
|---|---|---|---|
| 2011/0063673 | A1 | 3/2011 | Yoshida et al. |
| 2012/0105886 | A1* | 5/2012 | Takai .................. G03G 15/502 358/1.13 |
| 2014/0337722 | A1* | 11/2014 | Asai ........................ G09G 5/00 715/274 |
| 2015/0161767 | A1* | 6/2015 | Monden .................... G06T 3/60 345/428 |
| 2015/0312436 | A1* | 10/2015 | Mutsuo .................... H04N 1/04 358/475 |

FOREIGN PATENT DOCUMENTS

| | | | |
|---|---|---|---|
| CN | 103873718 A | | 6/2014 |
| CN | 105025194 A | | 11/2015 |
| EP | 2199865 A2 | | 6/2010 |
| JP | H07143340 A | | 6/1995 |
| JP | 2015055902 A | * | 3/2015 |

* cited by examiner

FIG.9A
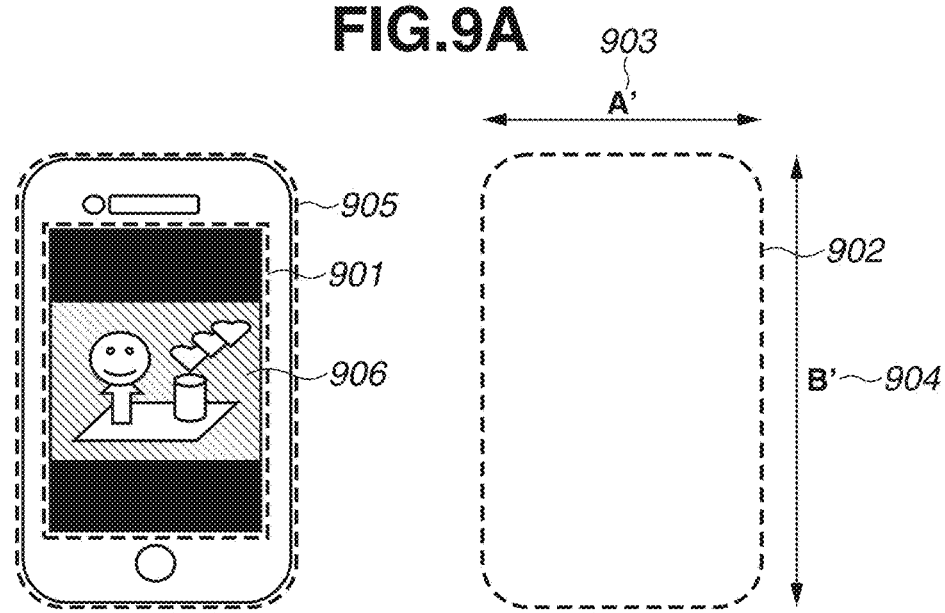
FIG.9B
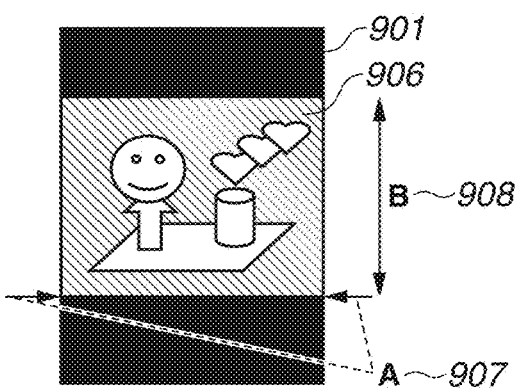
FIG.9C
| | | IMAGE REGION | |
| --- | --- | --- | --- |
| | | B / A < 1 | B / A ≥ 1 |
| TARGET REGION | B' / A' < 1 | ORIENTATION IS CORRECT | ORIENTATION IS NOT CORRECT |
| | B' / A' ≥ 1 | ORIENTATION IS NOT CORRECT | ORIENTATION IS CORRECT |

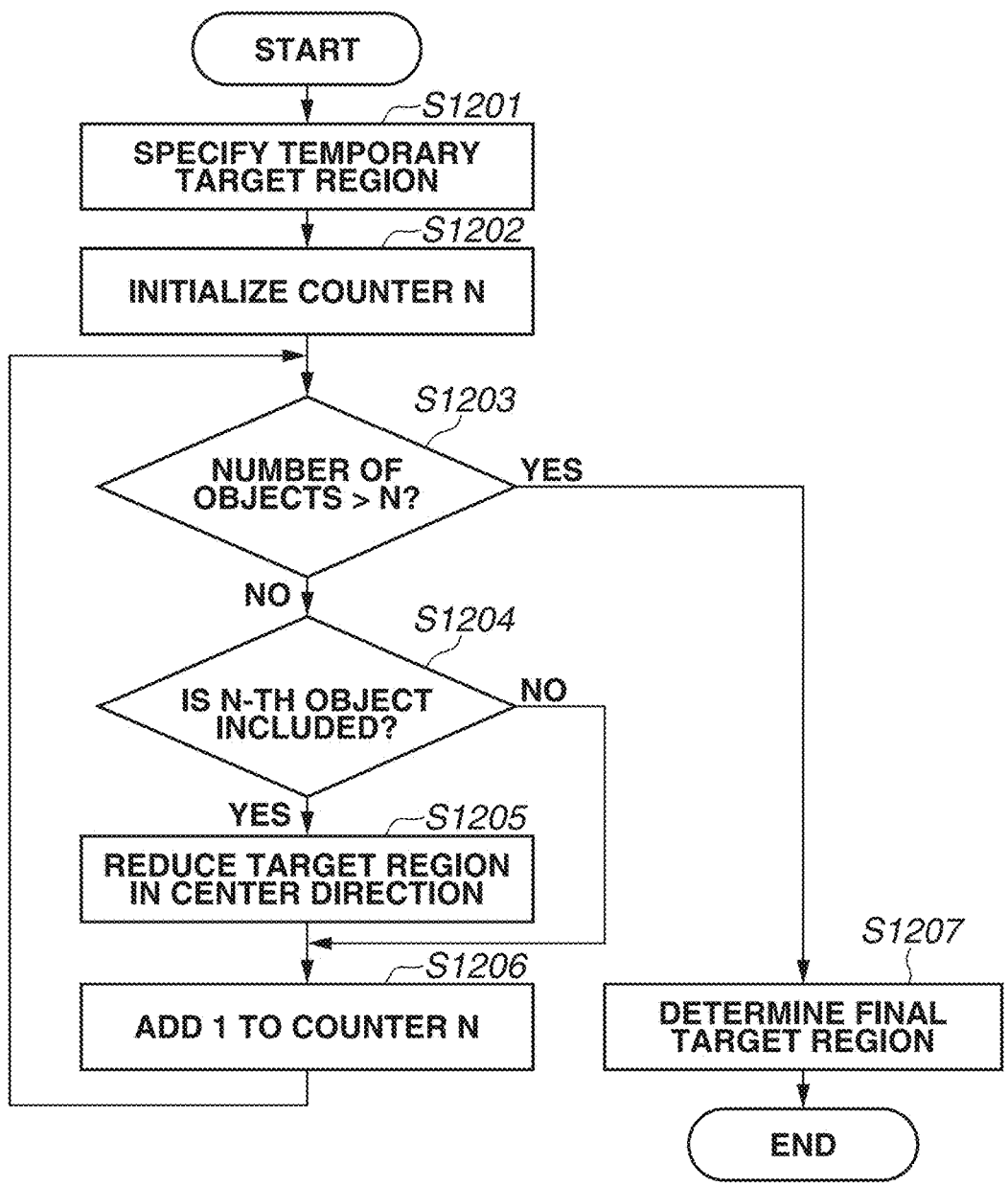

FIG.13

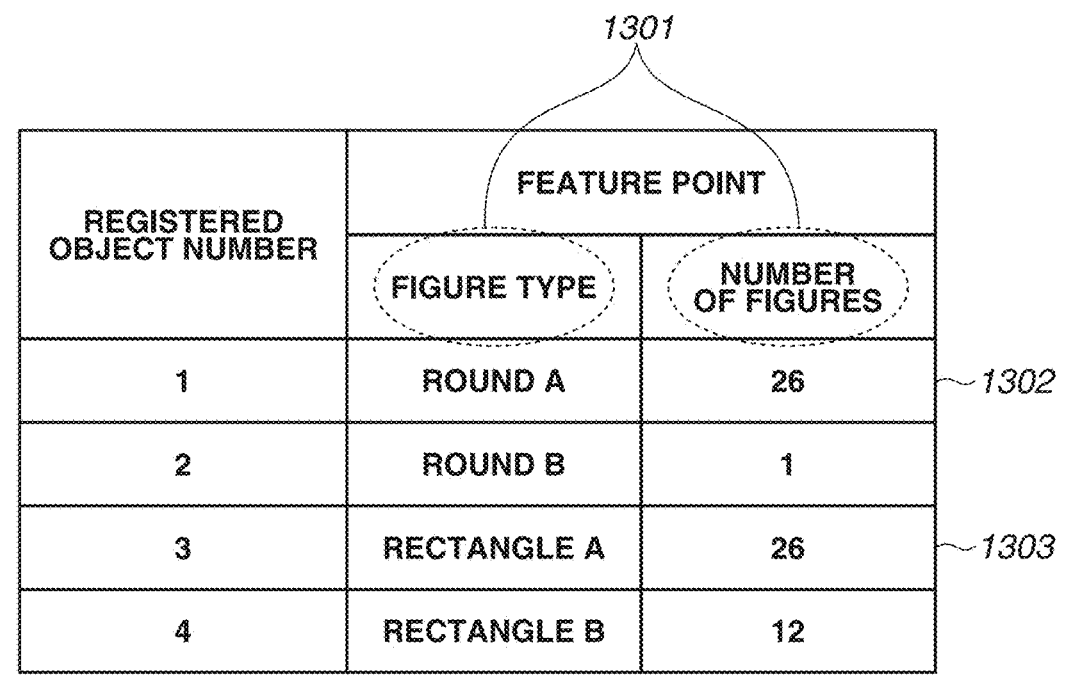

| REGISTERED OBJECT NUMBER | FEATURE POINT | |
|---|---|---|
| | FIGURE TYPE | NUMBER OF FIGURES |
| 1 | ROUND A | 26 |
| 2 | ROUND B | 1 |
| 3 | RECTANGLE A | 26 |
| 4 | RECTANGLE B | 12 |

FIG.16

| REGISTERED OBJECT NUMBER | FEATURE POINT | | | |
|---|---|---|---|---|
| | UPPER LEFT | UPPER RIGHT | LOWER LEFT | LOWER RIGHT |
| 1 | CHARACTER "Q" | CHARACTER "P" | CHARACTER "Z" | CHARACTER "M" |
| 2 | CHARACTER "1" | CHARACTER "3" | CHARACTER "*" | CHARACTER "#" |

READING CONTROL APPARATUS, CONTROL METHOD, AND STORAGE MEDIUM

BACKGROUND OF THE INVENTION

Field of the Invention

The present invention relates to a reading control apparatus, a control method, and a storage medium.

Description of the Related Art

A reading control apparatus for causing a reading device to read a reading target placed on a document platen to acquire image data is known. Further, in recent years, a terminal apparatus including a unit for emitting light itself, such as a display device including a liquid crystal display, has been widely used. Japanese Patent Application Laid-Open No. 7-143340 discusses a technique for reading a display surface, which is a surface including a display device of such a terminal apparatus placed on a document platen, thereby acquiring image data based on an image displayed on the display device. Specifically, Japanese Patent Application Laid-Open No. 7-143340 discusses a technique for reading a display surface of a terminal apparatus without emitting light to the terminal apparatus, thereby acquiring image data based on an image displayed on a display device.

Generally, when a reading control apparatus causes a reading device to read a display surface of a terminal apparatus placed on a document platen, thereby acquiring image data based on an image displayed on a display device, it is desirable that as large an image as possible should be displayed on the display device of the terminal apparatus. This is because the reading control apparatus causes the reading device to read the display surface in the state where a larger image is displayed on the display device, and thereby can acquire image data that allows the display of a larger image. Further, generally, image data that allows the display of a larger image is acquired, thereby improving the degree of satisfaction of a user.

However, some terminal apparatuses including a display device as described above have the function of changing the size of an image displayed on the display device. Examples of the function of changing the size of an image displayed on the display device include the function of distinguishing the top-bottom direction of the terminal apparatus and changing the orientation or the size of an image displayed on the display device (an image rotation function). Due to such a function, even though the display device of the terminal apparatus placed on a document platen so as to be read can display an image in a first size, the state where the image in a second size smaller than the first size is displayed may occur without the user's intention. In a case where a display surface is read in this state, the reading control apparatus cannot obtain image data based on the image in the first size (i.e., an image in a larger size) as image data based on the image displayed on the display device. That is, even though the user desires the image data based on the image in the first size, a case where the reading control apparatus cannot acquire the image data based on the image in the first size may occur without the user's intention. Thus, convenience for the user may decrease.

The present invention is directed to improving convenience for a user when a reading device is caused to read a display surface of a terminal apparatus having the function of changing the size of an image to be displayed on a display device.

SUMMARY OF THE INVENTION

According to an aspect of the present invention, a reading control apparatus for causing a reading device to read a reading target placed on a document platen, thereby acquiring image data includes a reading unit configured to cause the reading device to read, as the reading target, a display surface, which is a surface including a display device of a terminal apparatus operating in either of a first state where an image in a first size is displayed on the display device, and a second state where the image in a second size smaller than the first size is displayed on the display device, thereby acquiring image data, and a notification unit configured to, in a case where the terminal apparatus placed on the document platen is not in the first state, execute a notification process for notifying a user that the terminal apparatus is not in the first state, and after the notification process is executed by the notification unit, the reading unit causes the reading device to read as the reading target the display surface of the terminal apparatus in the first state according to an instruction from the user.

Further features of the present invention will become apparent from the following description of exemplary embodiments with reference to the attached drawings.

BRIEF DESCRIPTION OF THE DRAWINGS

FIGS. 9A, 9B, and 9C are diagrams illustrating relationships between regions in a surface including a display device of the terminal apparatus.

FIG. 12 is a flowchart illustrating the calculation process for calculating the target region.

FIG. 13 is a diagram illustrating a table regarding registered objects.

FIG. 16 is a diagram illustrating a table regarding registered objects.

DESCRIPTION OF THE EMBODIMENTS

Exemplary embodiments of the present invention will be described in detail below with reference to the accompanying drawings. The following exemplary embodiments do not limit the present invention according to the appended claims, and not all the combinations of the features described in the exemplary embodiments are essential for a method for solving the problems in the present invention.

A first exemplary embodiment is described below. A description is given of a reading control apparatus to which the present invention is applied. In the present exemplary embodiment, as an example of the reading control apparatus, a multifunction peripheral (MFP) having an image reading function (a scan function) for causing a reading device to read a reading target to acquire image data, and a print function using an inkjet recording method is illustrated. However, instead of the MFP, a single-function peripheral (SFP) may be used. The reading control apparatus may function as an image reading apparatus.

Figure 1:
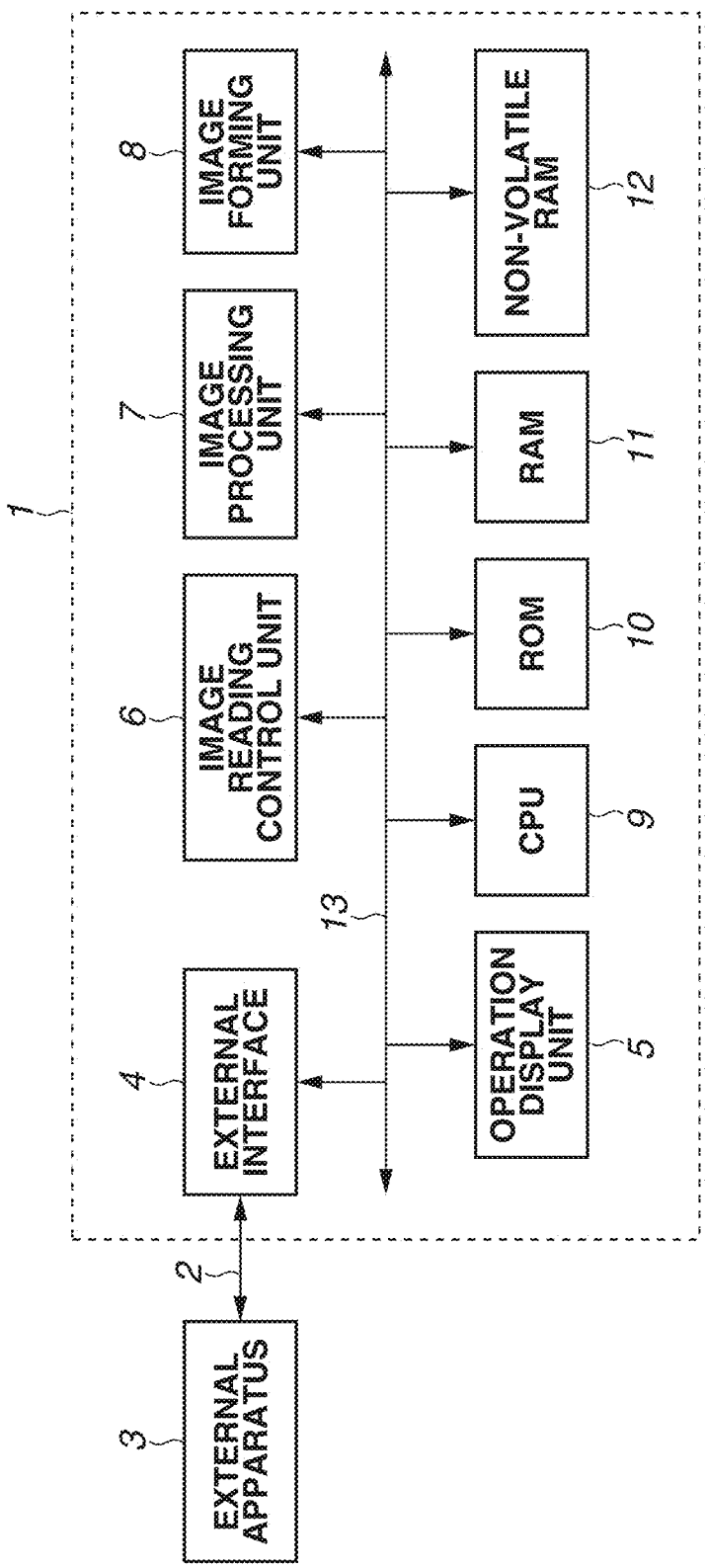
FIG. 1 is a block diagram illustrating a hardware configuration of a reading control apparatus.

FIG. 1 is a block diagram illustrating the hardware configuration of an MFP 1, which is a reading control apparatus according to the present exemplary embodiment. As described above, the MFP 1 has a scan function for saving, in a predetermined storage area, image data generated by reading a document. Further, the MFP 1 has a copy function for printing an image based on image data generated by reading a document, and an email function for transmitting image data generated by reading a document to an external apparatus outside the MFP 1.

The MFP 1 is connected to an external apparatus 3 via an external interface 4 and an external bus 2. In the present exemplary embodiment, the external bus 2 is based on Universal Serial Bus (USB), and the external interface 4 is a USB interface. The present invention, however, is not limited to this form. For example, the external bus 2 may be a bus using another wired communication method. Further, the MFP 1 may connect wirelessly to the external apparatus 3, using the external interface 4 as a wireless communication unit. In this case, the MFP 1 may directly communicate with the external apparatus 3 through wireless communication, or may communicate with the external apparatus 3 via an external access point present outside the MFP 1 and the external apparatus 3. Examples of the wireless communication method used in the wireless connection between the MFP 1 and the external apparatus 3 include Wireless Fidelity (Wi-Fi) (registered trademark) and Bluetooth (registered trademark). Further, examples of the external access point include a device such as a wireless local area network (LAN) router.

A central processing unit (CPU) 9 is a processor for controlling the MFP 1 according to a program. Specifically, the CPU 9 loads a control program stored in a read-only memory (ROM) 10 into a random-access memory (RAM) 11, reads the control program when necessary, and performs various types of control such as reading control and print control.

An internal bus 13 is a bus for connecting hardware components included in the MFP 1.

The ROM 10 stores various programs such as a control program to be executed by the CPU 9 and an embedded operating system (hereinafter, "OS") program. In the present exemplary embodiment, the control program stored in the ROM 10 performs software control such as scheduling and a task switch under control of the embedded OS stored in the ROM 10. Further, in the present exemplary embodiment, the ROM 10 also stores image data, various programs, and various pieces of setting information. In the present exemplary embodiment, the ROM 10 is assumed to be flash storage. Alternatively, the ROM 10 may be an auxiliary storage device such as a hard disk. Further, in the present exemplary embodiment, the ROM 10 stores a reading program for a self-emitted-light reading target, a reading program for a reflected-light reading target, and a program for an orientation determination. Control executed by each program will be described below.

The RAM 11 is a memory composed of a static random-access memory (SRAM) and stores management data of the MFP 1, such as a program control variable and a setting value registered by a user. In the RAM 11, a buffer area for various works is provided. The above data may be saved not in the RAM 11 but in another storage area such as the ROM 10 or a non-volatile RAM 12. Further, the RAM 11 is used as a work area or a temporary storage area into which various programs stored in the ROM 10 are loaded. In the present exemplary embodiment, the RAM 11 stores image data generated by the reading programs for a self-emitted-light reading target and a reflected-light reading target, and the result of an orientation determination (described below). The non-volatile RAM 12 is a memory capable of holding data without volatilizing the data even if the MFP 1 is turned off. Specifically, the non-volatile RAM 12 stores user data such as network information, a list of external apparatuses to which the MFP 1 has connected in the past, a menu item such as a print mode, and setting information of the MFP 1 such as correction information of a recording head. In the present exemplary embodiment, a computer is formed using the CPU 9, the ROM 10, and the RAM 11.

An operation display device 5 includes a liquid crystal display device having a touch panel function, and an operation key. That is, the operation display device 5 functions as an operation unit for receiving various operations from the user, and a display device for displaying information to the user. In the present exemplary embodiment, the operation display device 5 includes a touch panel, thereby configuring the operation unit and the display device as the same unit. Alternatively, for example, the operation unit may include a physical key, thereby configuring the operation unit and the display device as different units. Further, the MFP 1 receives an operation on the operation display device 5 performed by the user and thereby can receive a print operation command, a copy operation command, or a scan operation command from the user. If receiving a print operation command from the user through the operation display device 5, the MFP 1 performs printing based on image data stored in a recording medium such as a Secure Digital (SD) card. Further, in the present exemplary embodiment, on the operation display device 5 displays a screen for indicating to the user the manner of placing a terminal apparatus on a document platen of the MFP 1.

An image reading control unit 6 is a circuit for performing analog-to-digital (A/D) conversion on an analog electric signal obtained by causing an image sensor unit (a reading device) to read a document, and also for correcting the characteristics of the image sensor unit. The image sensor unit includes a light source for emitting light to a document, and an image sensor in which elements for reading and photoelectrically converting the light reflected from the document are arranged. Further, the image reading control unit 6 also includes a circuit for performing direct memory access (DMA) transfer to store, in the RAM 11, image data obtained by performing A/D conversion on the analog electric signal. In the present exemplary embodiment, when reading a reflected-light reading target, the image sensor unit controls the light source for emitting light to a document. When reading a self-emitted-light reading target, the image sensor unit controls the light source for emitting light to a document so that the light source does not emit light.

An image processing unit 7 is a circuit for reading image data stored in a memory such as the RAM 11 and performing various types of image processing such as a smoothing process, a recording density correction process, and color correction on the image data. Further, the image processing unit 7 includes a circuit for reading image data stored in a memory such as the RAM 11 and performing an encoding process on the image data using a Joint Photographic Experts Group (JPEG) method, and a circuit for performing a decoding process on encoded data. As the encoding method, for example, a JPEG method is applicable. Alternatively, another encoding method may be applied.

In the present exemplary embodiment, the reading control apparatus includes the reading device, the image reading control unit 6, and the image processing unit 7. The present invention, however, is not limited to this form. The reading control apparatus may include not all these components. For example, the reading control apparatus may be an apparatus for transmitting a scan instruction to an external scanner apparatus including these components, thereby acquiring image data from the scanner apparatus.

The external apparatus 3 is an external apparatus of the MFP 1 and is an apparatus such as a mobile phone, a smartphone, a personal computer (PC), a tablet terminal, a personal digital assistant (PDA), or a digital camera. This is the description of the hardware configuration diagram.

A scanning process according to the present exemplary embodiment is described. In a case where the MFP 1 is used as a scanner, first, the CPU 9 scans the image reading control unit 6 including the image sensor unit in a predetermined direction, while causing a light-emitting diode (LED) to emit light to a document placed on a document reading surface. Specifically, the CPU 9 changes light to be emitted from the LED to red (R), green (G), and blue (B), thereby controlling light incident on the image sensor. Then, the CPU 9 causes the image sensor of the image reading control unit 6 to read the light reflected from the document, thereby obtaining an analog electric signal. Then, the CPU 9 causes the image reading control unit 6 to perform A/D conversion on the obtained analog electric signal and correct the characteristics of the image sensor unit, thereby obtaining a digital signal. In the present exemplary embodiment, the image sensor obtaining an output corresponding to a certain region corresponds to the image sensor reading a document of the region to generate image data corresponding to the region. Then, the CPU 9 saves the digital signal as image data in the RAM 11. Then, the CPU 9 causes the image processing unit 7 to perform JPEG encoding on the image data saved in the RAM 11, thereby obtaining encoded data.

Then, the CPU 9 stores the encoded data in the RAM 11. Then, the CPU 9 transmits the encoded data from the external interface 4 to the external apparatus 3 via the external bus 2. The external apparatus 3 decodes the received encoded data and thereby can acquire image data obtained by the scanning.

In a case where a copying process is executed using the MFP 1 as a copying machine, the CPU 9 performs processing similar to that in the scanning process until encoded data is stored in the RAM 11. Then, the CPU 9 causes the image processing unit 7 to decode the encoded data, thereby obtaining image data again. Then, the CPU 9 performs various types of image processing on the obtained image data, thereby obtaining print data. Then, the CPU 9 causes an image forming unit 8 to form an image based on the obtained print data on a recording medium (paper) using a recording agent (ink or toner). Consequently, the copying process is executed.

Figure 2:
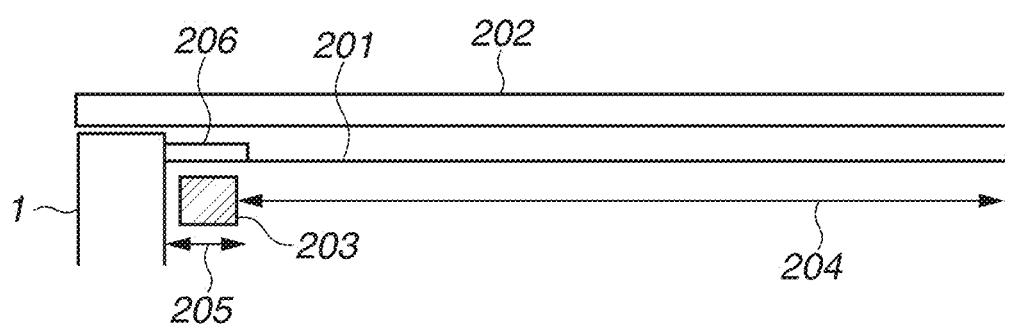
FIG. 2 is a schematic cross-sectional view of an image reading control unit included in the reading control apparatus.

FIG. 2 is a schematic cross-sectional view of the image reading control unit 6 included in the MFP 1.

A document platen 201 includes contact glass for maintaining a constant distance between a scanner sensor and a document, and a component for holding the contact glass. On the document platen 201, a document can be placed.

A scanner cover 202 is a cover capable of pivoting between a closing position where the document platen 201 is covered, and an opening position where the document platen 201 is opened. If the scanner cover 202 is lifted up and located at the opening position, the user can place a document on the document platen 201. The scanner cover 202 is located at the closing position and thereby can function also as a pressure plate for holding down the document placed on the document platen 201. The user can lift up the scanner cover 202 (pivot the scanner cover 202 upward in a direction perpendicular to the document platen 201) using as a pivot point a hinge placed on the document platen 201. At this time, to a surface of the scanner cover 202 in contact with the document placed on the document platen 201, a white sheet for obtaining scanned image data without impairing the scanned image data is stuck. The surface in contact with the document placed on the document platen 201 is, in other words, a surface opposed to the document platen 201 in the state where the scanner cover 202 is located at the closing position. In the state where the scanner cover 202 is located at the closing position, and light from outside is blocked, the image reading control unit 6 reads a reading target object (a document) placed between the scanner cover 202 and the document platen 201, thereby generating image data. In the present exemplary embodiment, the image reading control unit 6 reads the reading target object using an image sensor unit 203, which includes a contact image sensor (hereinafter, a "CIS"), as a component for reading the reading target object.

Further, the image reading control unit 6 includes the image sensor unit 203 and a moving device for driving the image sensor unit 203 in a direction (a direction 204) approximately parallel to the document platen 201. The configuration of the image reading control unit 6 is not limited to the above form. For example, to the image reading control unit 6, a known configuration such as a charge-coupled device (CCD) image sensor is applicable. Except while performing a reading operation, the image sensor unit 203 is located at a standby position 205. In the present exemplary embodiment, the standby position 205 is a position opposed to a calibration sheet 206. The calibration sheet 206 is a sheet for acquiring white reference data for correcting the characteristics of the image sensor unit 203.

A reflected-light reading target and a self-emitted-light reading target are described. A reading target such as paper or film does not emit light itself. Thus, to read the target by the scanning process, it is necessary to emit light to the target and read the light reflected from the target. In the present exemplary embodiment, such a reading target that does not emit light itself is referred to as a "reflected-light reading target". Further, a region on the reflected-light reading target is referred to as a "reflected-light region". On the other hand, there is also a reading target, such as a terminal apparatus, including a part that emits light itself. The terminal apparatus is an apparatus including a self-light-emission unit such as a display device composed of a cathode ray tube display, a liquid crystal display, a plasma display, or an organic electroluminescent (EL) display. As the terminal apparatus, for example, a smartphone, a mobile phone, a tablet terminal, a PDA, a digital camera, a music reproduction apparatus, or a game apparatus is applicable. In the present exemplary embodiment, such a reading target including a self-light-emission unit is referred to as a "self-emitted-light reading target". In the present exemplary embodiment, light emission includes the emission of light by luminescence.

FIGS. 8A, 8B, 8C, and 8D are diagrams illustrating the relationships between methods for placing a terminal apparatus 801 (a smartphone) on a document platen 802 of the MFP 1, and images displayed in a case where the top-bottom direction of the terminal apparatus 801 is changed. In this case, as illustrated in FIGS. 8A, 8B, 8C, and 8D, a vertically long smartphone is applied as the terminal apparatus 801. Further, in the state where the terminal apparatus 801 is vertically oriented, a display device of the terminal apparatus 801 is vertically long.

Further, the terminal apparatus 801 has the function of rotating an image (a display image) displayed on the display device of the terminal apparatus 801 according to the orientation of the terminal apparatus 801, and changing the orientation and the size of the display image (an image rotation function). The orientation of the terminal apparatus 801 and the orientation of the display image are orientations in a direction perpendicular to the ground. In a case where the orientation of the terminal apparatus 801 in a direction parallel to the ground is changed, this function does not change the orientation and the size of the display image. Further, the display image is an image corresponding to image data selected by the user operating the terminal apparatus 801.

First, in the state where the terminal apparatus 801 is vertically oriented, the lower short side of the terminal apparatus 801 is brought into contact with any position 803 on the document platen 802. The document platen 802 corresponds to the document platen 201 in FIG. 2. At this time, since the terminal apparatus 801 is vertically oriented, an image as illustrated in FIG. 8C is displayed on the terminal apparatus 801. That is, the orientation (upward) of the terminal apparatus 801 and the orientation (upward) of the image displayed on the display device of the terminal apparatus 801 coincide with each other. The image displayed at this time is an image represented by image data selected by the user and is a horizontally long image. In this state, as in an operation 804, the terminal apparatus 801 is placed on the document platen 802 so that a surface including the display device of the terminal apparatus 801 comes into contact with the document platen 802. In such a manner of placement, the terminal apparatus 801 can be placed on the document platen 802 in the state where the image as illustrated in FIG. 8C is displayed on the terminal apparatus 801. The state where the terminal apparatus 801 is placed on the document platen 802 is the state where a display surface of the terminal apparatus 801 is parallel to the document platen 802. Thus, even if the terminal apparatus 801 is rotated in the horizontal direction in this state, the top-bottom direction of the image displayed on the display device does not change.

An image region 805 is a region (an image region) corresponding to an image displayed on the display device of the terminal apparatus 801 and represented by image data selected by the user. The display device emits light itself, whereby the user can identify the image region 805. The image region 805 displayed at this time does not include a region that does not emit light itself or a region that emits light itself with a very small amount of light, and the entirety of the image region 805 strongly emits light itself.

As described above, in the state where the terminal apparatus 801 is vertically oriented, the display device of the terminal apparatus 801 is vertically long, and the displayed image is horizontally long. Thus, to display the entirety of the image on the display device such that the image is as large as possible, regions other than the image region 805 occur above and below the image region 805. These regions are regions 809 and 810, which are regions masked in black. Each of the regions 809 and 810 is a region that does not emit light itself or a region that emits light itself with a very small amount of light. Thus, the regions 809 and 810 are displayed in black on the display device.

On the other hand, there is also a use case where the terminal apparatus 801 is placed on the document platen 802 in the state where the terminal apparatus 801 is horizontally oriented. In the state where the terminal apparatus 801 is horizontally oriented, the display device of the terminal apparatus 801 is horizontally long. At this time, since the terminal apparatus 801 is horizontally oriented, an image as illustrated in FIG. 8D is displayed on the terminal apparatus 801. That is, if the state where the terminal apparatus 801 is vertically oriented is changed to the state where the terminal apparatus 801 is horizontally oriented, the image displayed on the display device rotates by a predetermined angle. Then, the state where the image as illustrated in FIG. 8C is displayed changes to the state where the image as illustrated in FIG. 8D is displayed. Consequently, even if the orientation of the terminal apparatus 801 changes, the orientation of the image displayed on the display device of the terminal apparatus 801 does not change. Thus, the state where the user easily views the image is maintained. That is, at this time, the orientation (horizontally oriented) of the terminal apparatus 801 and the orientation (upward) of the image displayed on the display device of the terminal apparatus 801 do not coincide with each other.

First, in the state where the terminal apparatus 801 is vertically oriented, the lower long side of the terminal apparatus 801 is brought into contact with any position 807 on the document platen 802. In this state, as in an operation 808, the terminal apparatus 801 is placed on the document platen 802 so that the surface including the display device of the terminal apparatus 801 comes into contact with the document platen 802. In such a manner of placement, the terminal apparatus 801 can be placed on the document platen 802 in the state where the image as illustrated in FIG. 8D is displayed on the terminal apparatus 801.

As described above, in the state where the terminal apparatus 801 is horizontally oriented, the display device of the terminal apparatus 801 is horizontally long, and the displayed image is horizontally long. Thus, to display the entirety of the image on the display device such that the image is as large as possible, regions other than the image region 805 occur on the left and right of the image region 805. These regions are regions 811 and 812, which are regions masked in black. Similarly to the regions 809 and 810, each of the regions 811 and 812 is a region that does not emit light itself or a region that emits light itself with a very small amount of light. Thus, the regions 811 and 812 are displayed in black on the display device.

The problems to be solved by the present invention are described. Some mobile terminal 801 has the function of changing the size of the image displayed on the display device. Examples of the function of changing the size of the image displayed on the display device include an image rotation function as described above, and the function of, according to a user operation, enlarging and displaying an image displayed as a thumbnail (a thumbnail enlargement function). The description is given taking the image rotation function as an example. As can be seen from FIGS. 8C and 8D, the size of the image region 805 changes according to the orientation of the display image relative to the orientation of the terminal apparatus 801. Specifically, as in a case where the aspect ratio of the display device of the terminal apparatus 801 and the aspect ratio of the display image exhibit similar tendencies, the closer the aspect ratio of the display device of the terminal apparatus 801 and the aspect ratio of the display image are to each other, the larger the image region 805 is when displayed. For example, if the sizes and the functions of a terminal apparatus and a display image are those illustrated in the present exemplary embodiment, the image region 805 is larger in a case where the orientation of the top-bottom direction of the terminal apparatus 801 and the orientation of the top-bottom direction of the display image are not the same as each other, than in a case where the orientation of the top-bottom direction of the terminal apparatus 801 and the orientation of the top-bottom direction of the display image are the same as each other. In the present exemplary embodiment, the state where the image region 805 is displayed such that the image region 805 is larger is referred to as a "maximum display state". The state where the image region 805 is displayed such that the image region 805 is smaller is referred to as a "minimum display state". That is, in this case, the state where the orientation of the terminal apparatus 801 and the orientation of the display image are the same as each other (e.g., FIG. 8C) is the minimum display state, and the state where the orientation of the terminal apparatus 801 and the orientation of the display image are not the same as each other (e.g., FIG. 8D) is the maximum display state.

In an image obtained by reading a self-emitted-light reading target, the user mainly desires an image corresponding to an image region. Thus, it is desirable that when a self-emitted-light reading target is read, an image region should be displayed such that the image region is large. The image rotation function, however, may change the size of the image region displayed on a display device. Thus, depending on an operation method of the user, even though a display device of a terminal apparatus placed on a document platen so as to be read can display an image region in a first size, the image region in a second size smaller than the first size may be displayed. Consequently, reading may be performed in the state where the image region is small. That is, in the above example, even though the image region 805 is larger in the state where the orientation of the terminal apparatus 801 and the orientation of the display image are not the same as each other, reading may be performed in the state where the orientation of the terminal apparatus 801 and the orientation of the display image are the same as each other. Further, taking the thumbnail enlargement function as an example, reading may be performed in the state where an image enlarged by the thumbnail enlargement function is reduced to a thumbnail by an erroneous operation of the user. In response, in the present exemplary embodiment, a determination process for determining whether a self-emitted-light reading target is placed on the document platen 802 in the maximum display state is performed. Specifically, in the present exemplary embodiment, an orientation determination process for determining whether the orientation of the image relative to the orientation of the terminal apparatus 801 is appropriate is performed. Then, if the orientation of the image relative to the orientation of the terminal apparatus 801 is not appropriate, a notification process for notifying the user that the terminal apparatus 801 is not in the maximum display state is executed. By the notification process, the user recognizes that the terminal apparatus 801 is not in the maximum display state. Then, the user resets the terminal apparatus 801 on the document platen 802 in the maximum display state and thereby can execute scanning. Thus, in other words, the notification process can also be said to be the process of prompting the user to change the state of the terminal apparatus 801 from the state where a small image region is displayed (the minimum display state) to the state where a larger image region is displayed (the maximum display state).

As described above, in the present exemplary embodiment, also in a case where, even though a display device included in a self-emitted-light reading target can display an image in a first size, the display device displays the image in a second size smaller than the first size, then as a result, it is possible to obtain image data based on the image in the first size. In other words, it is possible to prevent the occurrence, without the user's intention, of the situation where the image data based on the image in the first size cannot be obtained. Thus, it is possible to improve convenience for the user. The features of the present invention will be described in detail below.

Figure 3:
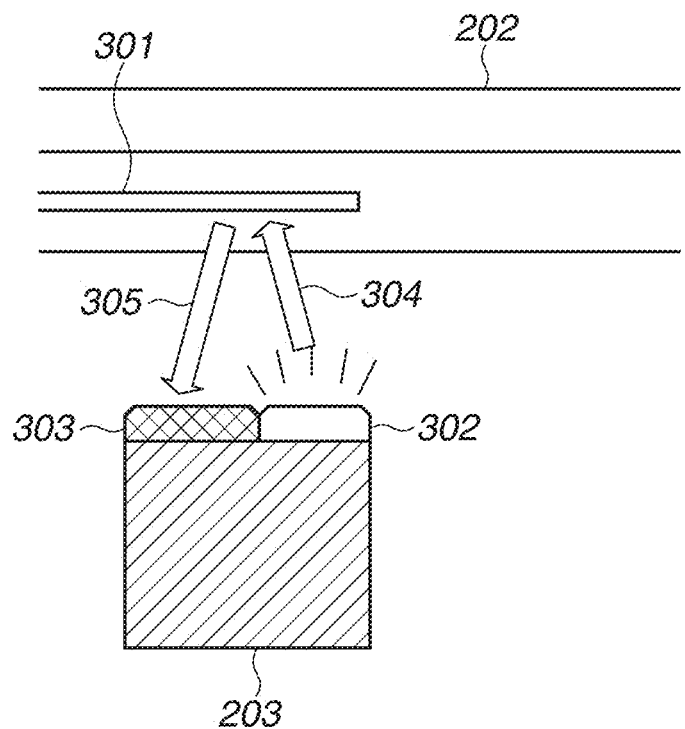
FIG. 3 is a schematic cross-sectional view of the image reading control unit in a state where the image reading control unit reads a reflected-light reading target in a light-emission-present mode.

When performing scanning, the MFP 1 according to the present exemplary embodiment can operate in a light-emission-present mode and a light-emission-absent mode. The light-emission-present mode is the mode of reading a reading target while causing a light-emitting unit 302 (an LED) of the image sensor unit 203 to emit light, and is generally used to read a reflected-light reading target. On the other hand, the light-emission-absent mode is the mode of reading a reading target without causing the light-emitting unit 302 to emit light (i.e., without emitting light to a reading target placed on the document platen 201), and is generally used to read a self-emitted-light reading target. FIG. 3 is a schematic cross-sectional view of the image reading control unit 6 in the state where the image reading control unit 6 reads a reflected-light reading target 301 in the light-emission-present mode. As described above, in the light-emission-present mode, the image reading control unit 6 obtains an output while emitting light to a reading target. FIG. 3 schematically illustrates the light-emitting unit 302 and a light-receiving unit 303 of the image sensor unit 203. The image reading control unit 6 causes the light-emitting unit 302 to emit light, whereby the emitted light passes through a path 304 and reaches the reflected-light reading target 301. Then, the light reaching the reflected-light reading target 301 is reflected from the reflected-light reading target 301, and the reflected light passes through a path 305 and reaches the light-receiving unit 303. The image sensor unit 203 obtains an analog signal from the light reaching the light-receiving unit 303, thereby forming image data. In a case where the image reading control unit 6 reads a region where the reflected-light reading target 301 is not present, the light-receiving unit 303 detects light reflected from the white sheet included in the scanner cover 202. Thus, an image represented by image data obtained by reading the region where the reflected-light reading target 301 is not present is a white image.

According to a user operation received by the operation display device 5, the MFP 1 according to the present exemplary embodiment can switch whether to operate in the light-emission-present mode or operate in the light-emission-absent mode.

Figure 4:
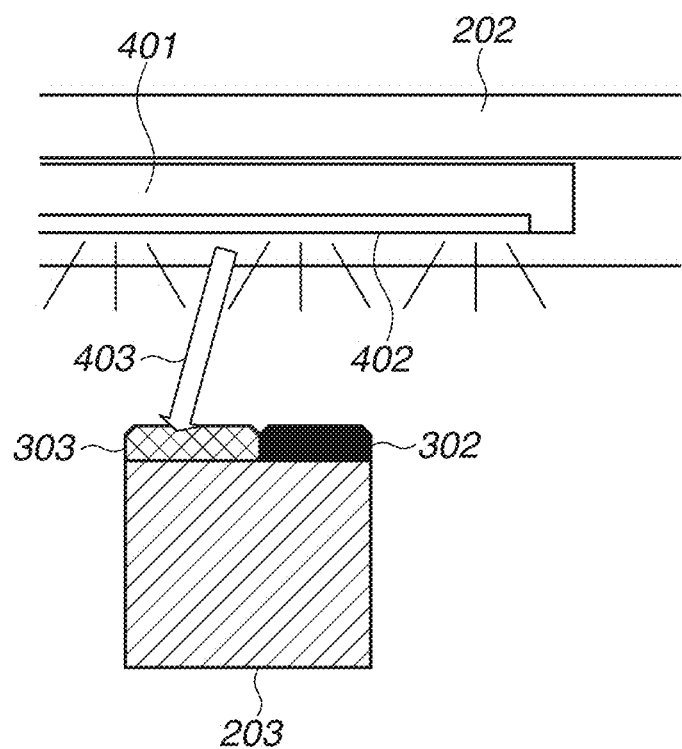
FIG. 4 is a schematic cross-sectional view of the image reading control unit in a state where the image reading control unit reads a self-emitted-light reading target in a light-emission-absent mode.

FIG. 4 is a schematic cross-sectional view of the image reading control unit 6 in the state where the image reading control unit 6 reads a self-emitted-light reading target 401 in the light-emission-absent mode. In the light-emission-absent mode, the image reading control unit 6 obtains an output without emitting light from the light-emitting unit 302 to a reading target. That is, without causing the light-emitting unit 302 to emit light, the image reading control unit 6 causes the light-receiving unit 303 to receive light emitted from a display device 402 of the self-emitted-light reading target 401 and having passed through a path 403, thereby generating image data.

Figure 5:
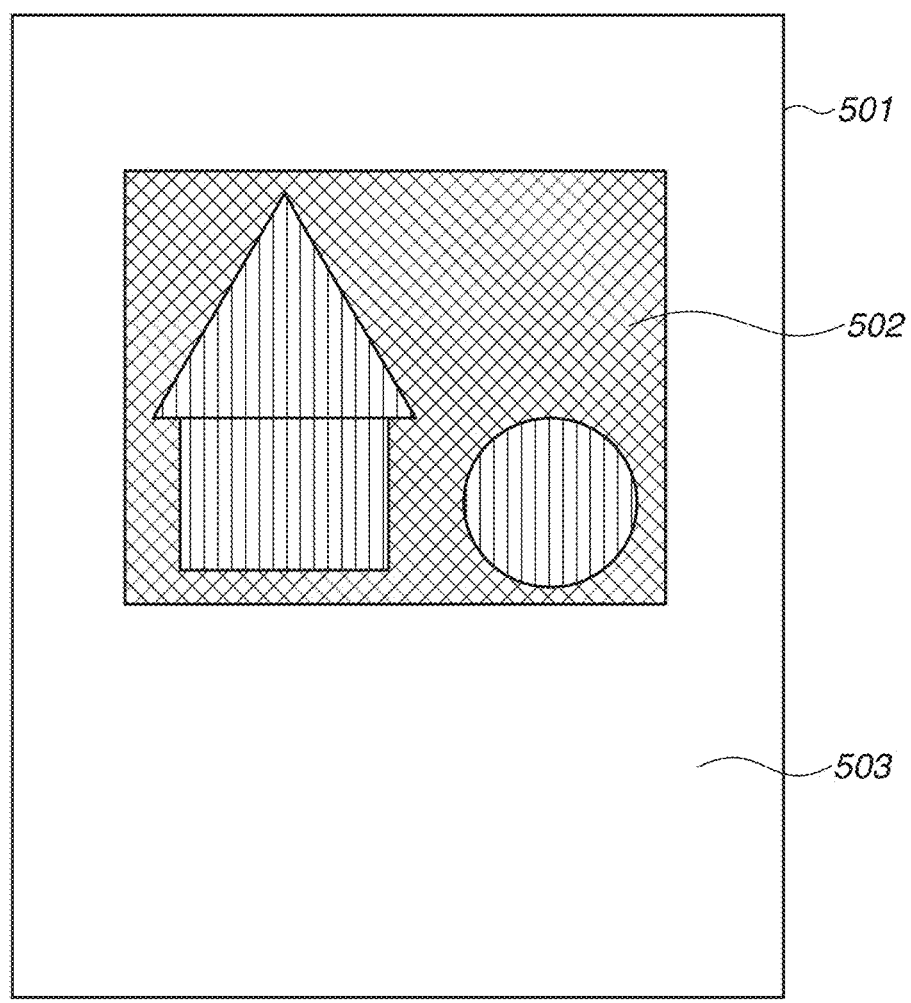
FIG. 5 is a diagram illustrating an image represented by image data obtained by reading the reflected-light reading target in the light-emission-present mode.

FIG. 5 schematically illustrates an image represented by image data obtained by reading the reflected-light reading target 301 placed on the document platen 201 in the light-emission-present mode. A read image 501 includes a reflected-light reading target region 502, which is indicated by shading, and an out-of-document region 503 other than the reflected-light reading target region 502. The reflected-light reading target region 502 is a region corresponding to the reflected-light reading target 301. The out-of-document region 503 is a region corresponding to a region outside the reflected-light reading target 301 on the document platen 201. As described above, if the region outside the reflected-light reading target 301 on the document platen 201 is read, an output is obtained from light reflected from the white sheet. Thus, the out-of-document region 503 is a white region. In a case where the reflected-light reading target 301 is not white, and the out-of-document region 503 is white, the boundary line between these regions is clear. Thus, the CPU 9 can clearly distinguish between the reflected-light reading target region 502 and the out-of-document region 503 by image processing.

Figure 6:
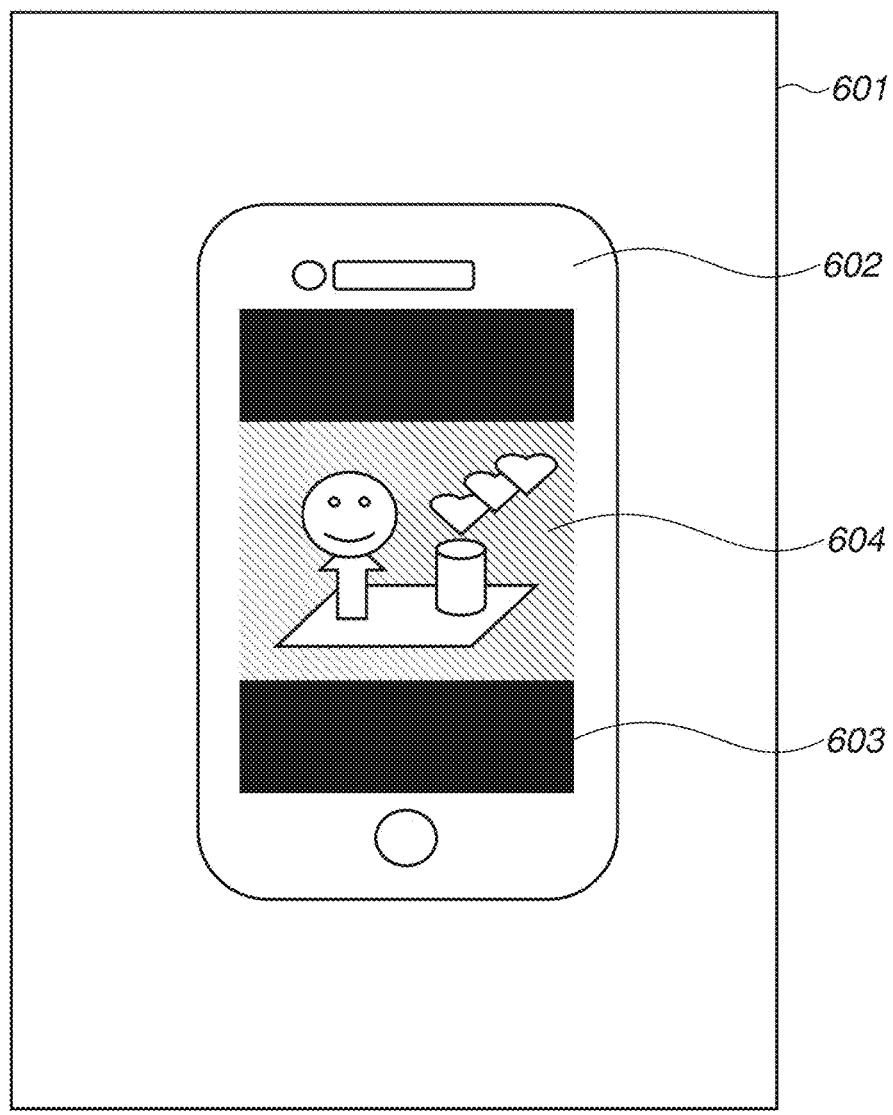
FIG. 6 is a diagram illustrating an image represented by image data obtained by reading the self-emitted-light reading target in the light-emission-present mode.

On the other hand, FIG. 6 schematically illustrates an image represented by image data obtained by reading the self-emitted-light reading target 401 (a smartphone) placed on the document platen 201 in the light-emission-present mode. The self-emitted-light reading target 401 includes a display device formed of a liquid crystal screen. A display device portion voluntarily emits light (emits light itself) and displays an image. Hereinafter, a unit capable of emitting light itself, such as a display device (a liquid crystal display) of a terminal apparatus, will be referred to as a "self-light-emitting unit". The image illustrated in FIG. 6 is acquired by scanning a terminal apparatus in which an image corresponding to image data selected by the user is displayed on a display device. A read image 601 includes a display surface region 602, an out-of-image region 603, and an image region 604. The display surface region 602 is the region of the entirety of a display surface, which is a surface including the display device of the self-emitted-light reading target 401. The out-of-image region 603 is, in a region corresponding to the display device, a region other than a region where the image based on the image data selected by the user is displayed. The image region 604 is, in a screen region displayed on the display device, a region corresponding to the image based on the image data selected by the user. Thus, a region obtained by combining the out-of-image region 603 and the image region 604 is a region corresponding to a self-light-emitting unit.

Figure 7:
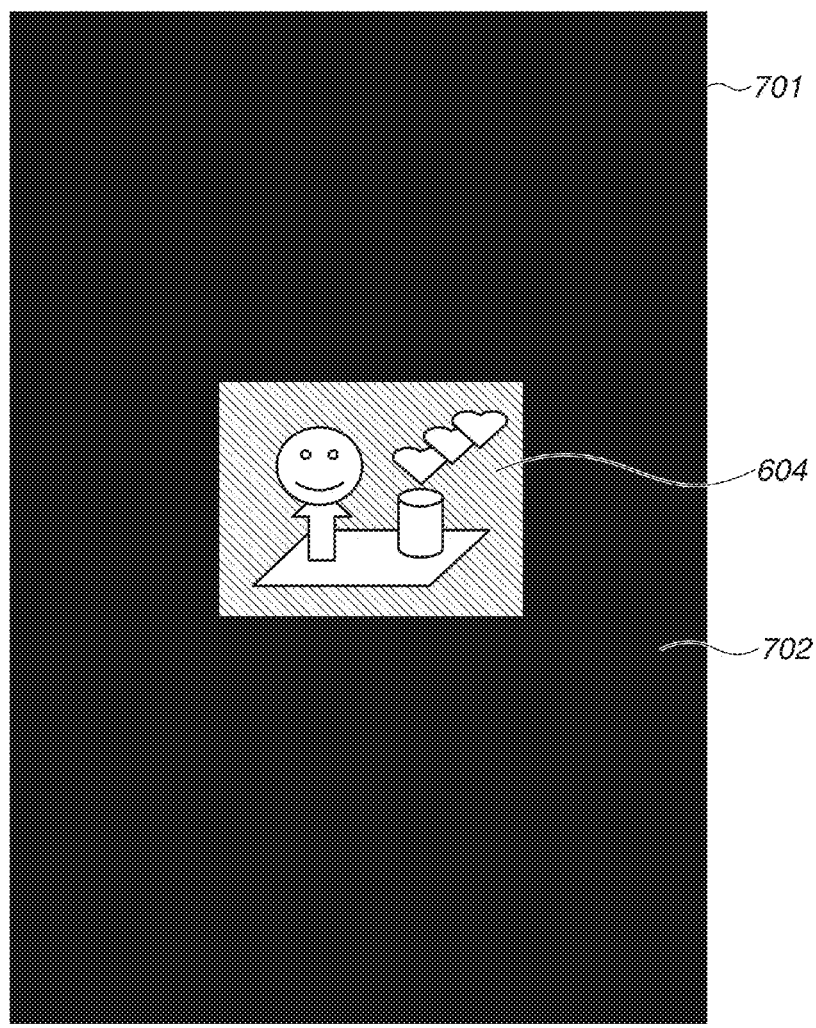
FIG. 7 is a diagram illustrating an image represented by image data obtained by reading the self-emitted-light reading target in the light-emission-absent mode.

FIG. 7 schematically illustrates an image represented by image data obtained by reading the self-emitted-light reading target 401 placed on the document platen 201 in the light-emission-absent mode. In the light-emission-absent mode, the light-emitting unit 302 does not emit light. Thus, only light emitted from the display device of the self-emitted-light reading target 401 is incident on the light-receiving unit 303. Thus, a read image 701 includes only a region (a self-light-emission region) corresponding to a part (a region) emitting light itself in the display surface of the self-emitted-light reading target 401, and a region other than the self-light-emission region. As described above, in the present exemplary embodiment, the display image on the terminal apparatus 801 does not include a region that does not emit light itself or a region that emits light itself with a very small amount of light, and the entirety of the image strongly emits light itself. Thus, the self-light-emission region is the entirety of the image region 604. Further, the region other than the self-light-emission region is a region 702, which is a region represented in black and is a region other than the image region 604. In a case where the self-emitted-light reading target 401 is thick, outside light may be incident from between the document platen 201 and the scanner cover 202, and the outside light may be incident on the image sensor unit 203 while performing reading. In the present exemplary embodiment, however, the position of the self-emitted-light reading target 401 is detected by a pre-scan, and a range based on the detected position is set as the range of reading in actual scans, thereby narrowing the range of reading in the actual scans. Further, in the actual scans, an output obtained in a region other than self-emitted-light reading target 401 detected in the pre-scan is cropped. With such a form, it is possible to perform reading in the light-emission-absent mode by substantially ignoring outside light incident from between the document platen 201 and the scanner cover 202.

Next, an orientation determination process is described in detail. In the present exemplary embodiment, the terminal apparatus 801 is read in both the light-emission-present mode and the light-emission-absent mode for the orientation determination process.

FIGS. 9A, 9B, and 9C are diagrams illustrating the relationships between regions in the surface (the display surface) including the display device of the terminal apparatus 801. Further, FIGS. 9A, 9B, and 9C illustrate an image obtained by reading the terminal apparatus 801 in the light-emission-present mode.

A region 901, which is a region indicated by a dashed line, is a region corresponding to a self-light-emitting unit. A region 905, which is a region indicated by a dashed line, is a region corresponding to the entirety of the display surface. An image region 906 illustrates a region included in the region 901 and corresponding to an image selected by the user.

As illustrated in FIG. 6, the MFP 1 reads the terminal apparatus 801 in the light-emission-present mode and thereby can obtain an image in which the boundary line between the regions 901 and 905 is clear. That is, the MFP 1 reads the terminal apparatus 801 in the light-emission-present mode and thereby can identify the regions 901 and 905 and specify the sizes of the regions 901 and 905. Hereinafter, as in the regions 901 and 905, a region that can be identified by reading the terminal apparatus 801 in the light-emission-present mode and is outside a self-light-emission region will be referred to as a "target region". The target region is used in the orientation determination process. As the target region, either of the regions 901 and 905 may be used. It is desirable that a region having a size and a shape as close to those of a region corresponding to the display device as possible should be used as a target region 902. In the present exemplary embodiment, however, since the region 905 can be easily identified by extracting the outermost boundary line, the region 905 is used as the target region 902. Further, a length 903 in the horizontal direction of the specified target region 902 is A', and a length 904 in the vertical direction of the specified target region 902 is B'. In a case where the region 905 is set as the target region 902, the target region 902 is shaped to have rounded corners. In this case, in the length in the horizontal direction and the length in the vertical direction of the target region 902, the lengths of the longest portions are A' and B'.

Further, as illustrated in FIG. 7, the MFP 1 reads the terminal apparatus 801 in the light-emission-absent mode and thereby can obtain an image in which the boundary line of the self-light-emission region is clear. That is, the MFP 1 reads the terminal apparatus 801 in the light-emission-absent mode and thereby can identify the self-light-emission region and specify the size of the self-light-emission region. As described above, in the present exemplary embodiment, since the self-light-emission region is the entirety of the image region 604, the image region 906 is specified by specifying the self-light-emission region. A length 907 in the horizontal direction of the specified image region 906 is A, and a length 908 in the vertical direction of the specified image region 906 is B.

The aspect ratio of the target region 902 is represented by B'/A'. Further, the aspect ratio of the image region 906 is represented by B/A. As described above, if the orientation of the display image relative to the orientation of the terminal apparatus 801 is the orientation in which the aspect ratio of the image region 906 is close to the aspect ratio of the display device of the terminal apparatus 801, the terminal apparatus 801 is in the maximum display state, and the image region 906 is displayed such that the image region 906 is larger. Thus, in the present exemplary embodiment, the MFP 1 calculates the values of B/A and B'/A', and according to whether the calculated values indicate similar tendencies, determines whether the orientation of the display image relative to the orientation of the terminal apparatus 801 is correct. Specifically, this determination result is obtained by determining whether each calculated value is equal to or greater than a predetermined threshold. At this time, using a table as illustrated in FIG. 9C and with reference to a cell corresponding to each calculated value, the MFP 1 makes the determination. Specifically, if both B/A and B'/A' are smaller than 1 or are equal to or greater than 1 (the calculated values indicate similar tendencies), the MFP 1 determines that the orientation is correct. Then, if one of B/A and B'/A' is smaller than 1, and the other is equal to or greater than 1 (the calculated values do not indicate similar tendencies), the MFP 1 determines that the orientation is not correct. As the predetermined threshold, a value other than 1 may be used.

As described above, using an image obtained in the light-emission-present mode and an image obtained in the light-emission-absent mode, the MFP 1 according to the present exemplary embodiment can determine whether the terminal apparatus 801 is placed on the document platen in the state where the orientation of the display image relative to the orientation of the self-emitted-light reading target is correct.

In the present exemplary embodiment, when executing the scanning process, the MFP 1 operates in either of a reflected-light reading target reading mode for reading a reflected-light reading target, and a self-emitted-light reading target reading mode for reading a self-emitted-light reading target. In the reflected-light reading target reading mode, the MFP 1 reads a document in the light-emission-present mode and does not read the document in the light-emission-absent mode. That is, the MFP 1 does not execute the orientation determination process. On the other hand, in the self-emitted-light reading target reading mode, the MFP 1 reads a document in the light-emission-present mode and the light-emission-absent mode and further executes the orientation determination process using obtained images. For example, according to an instruction from the user, the MFP 1 switches in which mode the MFP 1 is to operate when executing the scanning process.

Figure 10:
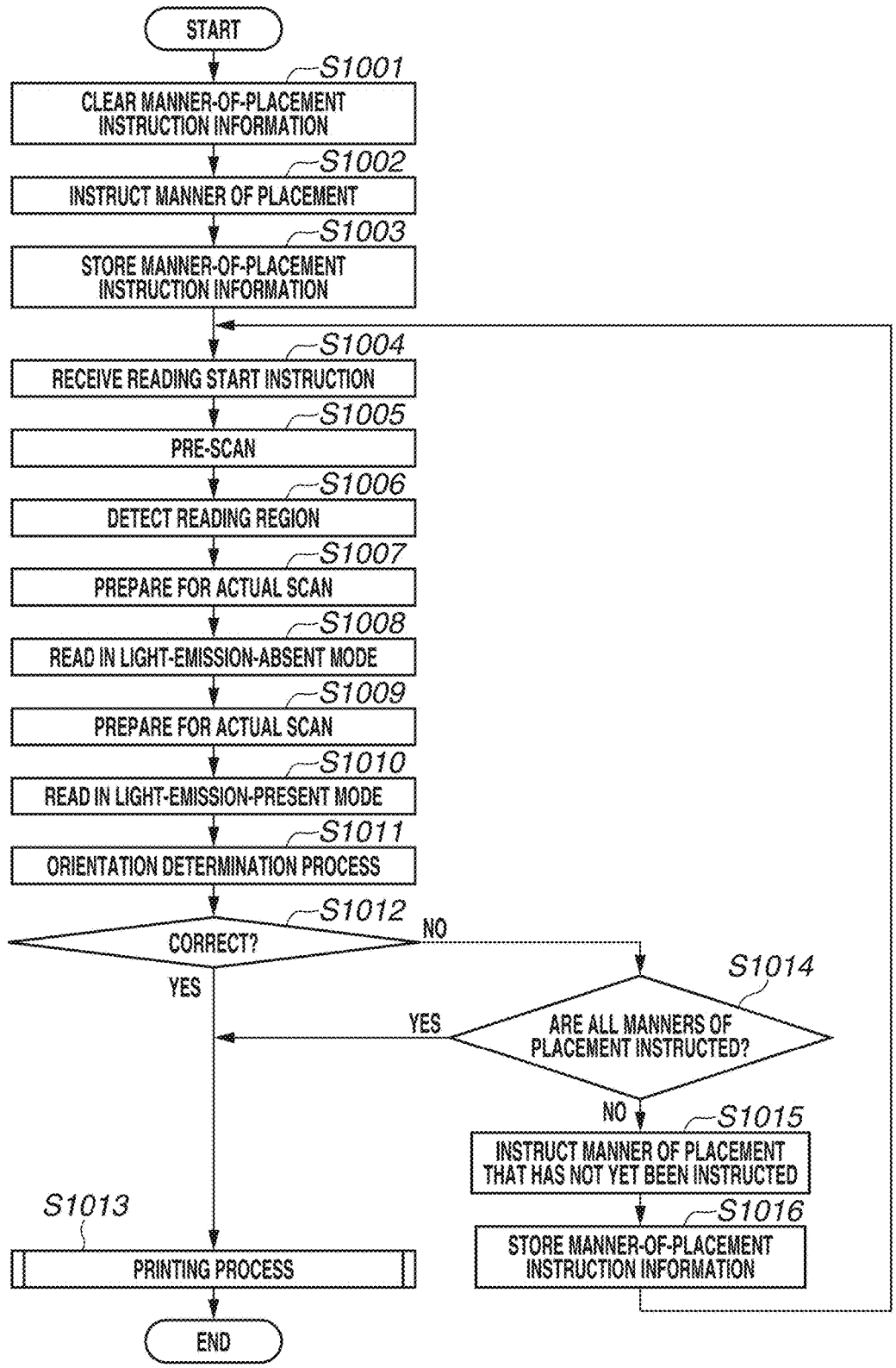
FIG. 10 is a flowchart illustrating processing executed by the reading control apparatus.

FIG. 10 is a flowchart illustrating processing executed by the MFP 1 in the present exemplary embodiment. The processing illustrated in this flowchart is achieved by, for example, the CPU 9 loading a program stored in the ROM 10 into the RAM 11 and executing the program. Further, the processing illustrated in this flowchart is started, for example, in a case where the user gives an instruction to execute the scanning process or the copying process in the self-emitted-light reading target reading mode.

First, in step S1001, the CPU 9 clears manner-of-placement instruction information stored in a memory such as the RAM 11. The manner-of-placement instruction information is information indicating which manner of placement is instructed as the manner of placing the terminal apparatus 801.

Next, in step S1002, the CPU 9 instructs a manner of placement. The CPU 9 instructs the user of either of a manner of placement for orienting the short side of the terminal apparatus 801 downward as in FIG. 8A and then placing the terminal apparatus 801 on the document platen 802, and a manner of placement for orienting the long side of the terminal apparatus 801 downward as in FIG. 8B and then placing the terminal apparatus 801 on the document platen 802. The manner of placement instructed at this time may be any manner of placement, and for example, may be a manner of placement for making a scan range small.

Next, in step S1003, the CPU 9 stores, in a memory such as the RAM 11, the manner-of-placement instruction information regarding the manner of placement instructed in step S1002.

Next, in step S1004, the CPU 9 receives a reading start instruction from the user. Specifically, the CPU 9 receives from the user a reading start operation performed on the operation display device 5. In this case, the CPU 9 receives from the user an instruction to execute the copying process, which is the process of executing scanning and printing based on image data acquired by the scanning. An instruction may be given to execute not only the copying process but also, for example, the process of executing scanning and saving, in the MFP 1, image data acquired by the scanning, or the process of executing scanning and transmitting, to an external apparatus of the MFP 1, image data acquired by the scanning. At this time, it is assumed that the user has placed a reading target on the document platen 802.

Next, in step S1005, the CPU 9 performs a pre-scan. The pre-scan is the process of reading the entire surface of the document platen 802, thereby identifying the size and the position of the terminal apparatus 801 placed on the document platen 802, and identifying a scan range. At this time, the CPU 9 reads the entire surface of the document platen 802 at 75 dpi in the light-emission-present mode.

Next, in step S1006, the CPU 9 detects a reading region. Specifically, the CPU 9 extracts the coordinate position of the terminal apparatus 801 on the document platen 802 from an image obtained by the pre-scan in step S1005 and specifies a region to be read by actual scans.

Next, in step S1007, the CPU 9 prepares for a first actual scan. Specifically, based on the coordinate position extracted in step S1006, the CPU 9 moves the image sensor unit 203 to the position where the reading of the terminal apparatus 801 is to be started. Further, the CPU 9 obtains parameters such as a reading speed and a coefficient for analog-to-digital conversion.

Next, in step S1008, the CPU 9 starts the first actual scan. Specifically, the CPU 9 reads the terminal apparatus 801 at 600 dpi in the light-emission-absent mode. Consequently, the CPU 9 obtains a region emitting light itself, i.e., an image that allows the identification of the image region 906.

Next, in step S1009, the CPU 9 prepares for a second actual scan. To obtain an image that allows the identification of the target region 902, the CPU 9 needs to perform reading in the light-emission-present mode. Thus, based on the coordinate position extracted in step S1006, the CPU 9 moves the image sensor unit 203 again to the position where the reading of the terminal apparatus 801 is to be started. Further, the CPU 9 obtains a parameter for causing the light-emitting unit 302 to emit light, and parameters such as a reading speed and a coefficient for analog-to-digital conversion.

Next, in step S1010, the CPU 9 starts the second actual scan. Specifically, the CPU 9 reads the terminal apparatus 801 at 600 dpi in the light-emission-present mode. Consequently, the CPU 9 obtains an image that allows the identification of the target region 902. Since it is only necessary to identify at least the target region 902 from an image read in the light-emission-present mode, the reading resolution may be lower than that in the first actual scan. The order of the first actual scan and the second actual scan is not limited, and these scans may be executed in the reverse order.

Next, in step S1011, the CPU 9 performs the orientation determination process. Specifically, first, the CPU 9 obtains the aspect ratios of the image region 906 and the target region 902 from the images obtained in steps S1008 and S1010. Then, based on the table in FIG. 9C, the CPU 9 determines whether the orientation of the display image relative to the orientation of the terminal apparatus 801 is correct.

Next, in step S1012, the CPU 9 determines whether it is determined that the orientation of the display image relative to the orientation of the terminal apparatus 801 is correct as a result of the orientation determination process in step S1011. If the result of the orientation determination process in step S1011 indicates that the orientation of the display image relative to the orientation of the terminal apparatus 801 is correct (YES in step S1012), the processing proceeds to step S1013. If, on the other hand, the result of the orientation determination process in step S1011 indicates that the orientation of the display image relative to the orientation of the terminal apparatus 801 is not correct (NO in step S1012), the processing proceeds to step S1014.

In step S1013, the CPU 9 executes printing based on the image data acquired in step S1008. Consequently, a print product on which an image corresponding to the image region 906 is printed is output. Alternatively, according to processing for which an instruction has been given by the user, the CPU 9 may save, in a predetermined storage area, image data obtained not by printing but by, for example, scanning, or may transmit the image data to a predetermined external apparatus.

In step S1014, the CPU 9 determines whether all manners of placement are instructed to the user. Specifically, the CPU 9 determines whether information indicating that all manners of placement are instructed to the user is saved in a memory such as the RAM 11. If it is determined that all manners of placement are instructed to the user (YES in step S1014), the processing proceeds to step S1013. In step S1013, the CPU 9 performs a printing process. The CPU 9 acquires image data every time a manner of placement is instructed. Thus, at this time, the CPU 9 has a plurality of pieces of image data acquired in the light-emission-present mode. In this case, the CPU 9 may use any of the plurality of pieces of image data. However, for example, the CPU 9 may compare the sizes of a plurality of image regions 906 included in a plurality of images represented by the plurality of pieces of image data and use image data corresponding to a larger one of the image regions 906. Further, for example, if it is determined that all manners of placement are instructed to the user, the processing may not proceed to step S1013, and the CPU 9 may notify the user of an error. Alternatively, the CPU 9 may display a screen for allowing the user to select whether to execute printing. Then, according to a received selection, the CPU 9 may specify whether to execute printing. If, on the other hand, it is determined that not all manners of placement are instructed to the user (NO in step S1014), the processing proceeds to step S1015. In a form in which a notification process in step S1015 is not the process of instructing a manner of placement, the process of step S1014 is omitted.

In step S1015, the CPU 9 executes a notification process for notifying the user that the terminal apparatus 801 is not in the maximum display state. Specifically, the CPU 9 displays on the operation display device 5 a screen indicating a manner of placement other than an already instructed manner of placement and instructs the user to place the terminal apparatus 801 on the document platen 802 again in the manner of placement other than the already indicated manner of placement. Manner-of-placement instruction information regarding the already instructed manner of placement is already saved in a memory such as the RAM 11. Thus, with reference to this manner-of-placement instruction information, the CPU 9 specifies a manner of placement that has not yet been instructed. The notification method is not limited to this form. The process of notifying the user that the orientation of the display image relative to the orientation of the terminal apparatus 801 is not correct, i.e., that the terminal apparatus 801 is not in the maximum display state, may only need to be performed. For example, the CPU 9 may notify the user of this state by a sound or the lighting of an LED, or may display a notification screen on a display device of an external apparatus used to give an instruction to execute scanning. Alternatively, the form may be such that the manner of placement other than the already instructed manner of placement is not indicated in detail, but an instruction is given to simply change the current manner of placement and execute scanning again. Yet alternatively, the form may be such that the CPU 9 simply notifies the user that the terminal apparatus 801 is not in the maximum display state or is in the minimum display state. Yet alternatively, for example, the CPU 9 may display a screen for confirming whether to allow the process illustrated in step S1013 to be performed based on image data obtained by reading the display surface of the terminal apparatus 801 in a state other than the maximum display state. If the CPU 9 receives an instruction to perform the process illustrated in step S1013 (an execution instruction) from the user through this screen, the processing proceeds to step S1013. If, on the other hand, the CPU 9 receives an instruction not to perform the process illustrated in step S1013 (a stop instruction) from the user through this screen, the processing does not proceed to step S1013. Then, the CPU 9 prompts the user to replace the terminal apparatus 801 on the document platen 802 and then performs the processes of step S1004 and thereafter again.

Next, in step S1016, the CPU 9 saves, in a memory such as the RAM 11, manner-of-placement instruction information corresponding to the manner of placement instructed in step S1015. Then, the CPU 9 executes the processes of step S1004 and thereafter, thereby performing a reading process for reading the terminal apparatus 801 placed on the document platen 802 by a method different from the previous method.

With such a form, if the orientation of the display image relative to the orientation of the terminal apparatus 801 is not correct, and the image region 906 is displayed such that the image region 906 is small, the MFP 1 according to the present exemplary embodiment can notify the user of this state. Thus, the MFP 1 can read the display surface of the terminal apparatus 801 in the state where the image region 702 is displayed such that the image region 702 is large, and can obtain a suitable image that is highly satisfactory to the user.

A second exemplary embodiment is described below. In the above exemplary embodiment, a description has been given of a form in which the region of the entirety of the display surface is identified as the target region. However, for example, if a physical keyboard or a button is present on the display surface, there is a case where the shape of the region of the entirety of the display surface is greatly different from the shape of a self-light-emitting unit. A description is given of a form in which it is possible to make a correct determination even in such a case by adding processing to be executed in the orientation determination process.

Figure 11A:
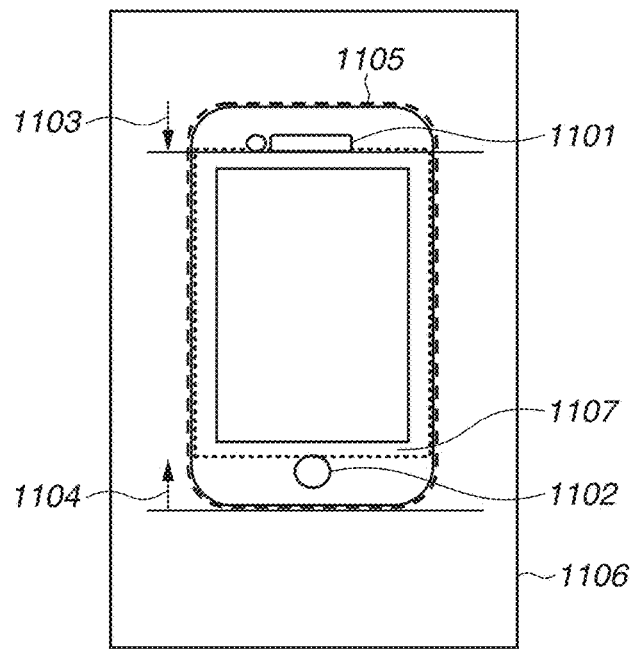
FIGS. 11A, 11B, and 11C are diagrams illustrating a calculation method for calculating a target region.
Figure 11B:
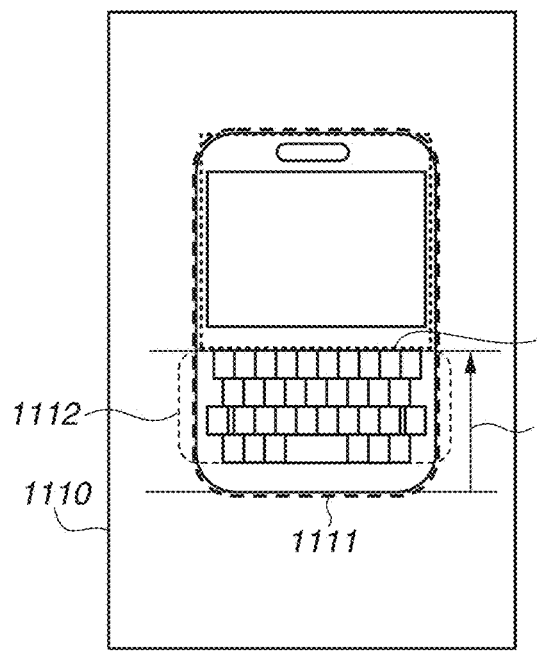
Figure 11C:
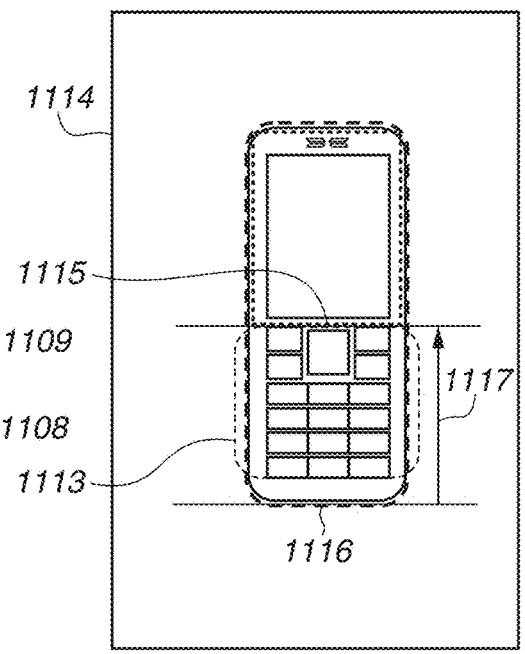

FIGS. 11A, 11B, and 11C are diagrams illustrating a calculation method for calculating the target region 902 according to the present exemplary embodiment. FIG. 11A illustrates an image obtained by reading, in the light-emission-present mode, the display surface of the terminal apparatus 801 in a form in which a physical keyboard is not included in the display surface. FIG. 11B illustrates an image obtained by reading, in the light-emission-present mode, the display surface of the terminal apparatus 801 in a form in which a physical keyboard based on the Japanese Industrial standards (JIS) layout is included in the display surface. FIG. 11C illustrates an image obtained by reading, in the light-emission-present mode, the display surface of the terminal apparatus 801 in a form in which a numeric-keypad-type physical keyboard is included in the display surface. Hereinafter, an image obtained by reading in the light-emission-present mode will be referred to as a "light-emission-present mode image".

First, to calculate the target region 902, the CPU 9 specifies, as a temporary target region, a region having the outermost boundary line in a light-emission-present mode image, i.e., a region corresponding to the entirety of the display surface of the terminal apparatus 801.

Then, the CPU 9 determines whether a predetermined object set in advance is included in the light-emission-present mode image. In the present exemplary embodiment, for example, the CPU 9 determines whether an object corresponding to an earpiece, an object corresponding to a round button, or an object corresponding to a physical keyboard is included in an obtained image. Hereinafter, the predetermined object set in advance will be referred to as a "registered object". The MFP 1 holds, in a memory such as the ROM 10, information regarding the shape of the registered object. If the degree of similarity between the shape of the registered object and the shape of an object included in the light-emission-present mode image exceeds a threshold, the CPU 9 determines that the registered object is included in the light-emission-present mode image.

After thus detecting an object, the CPU 9 sets, between the horizontal sides of the target region, the side closer to the detected object inside the detected object. That is, the CPU 9 narrows the range of the target region to the inside of the detected object. In other words, the CPU 9 reduces the range of the target region in the direction of the center of the obtained image. Then, if all determinations regarding the registered object and the setting of the range of the target region are completed, the CPU 9 determines the current target region as a final target region.

Specifically, for example, if an image 1106 illustrated in FIG. 11A is obtained, first, the CPU 9 specifies a region 1105, which is indicated by a dashed line, as a temporary target region and then detects an earpiece 1101 and a round button 1102. Then, the CPU 9 sets the horizontal sides of the target region inside the detected objects as illustrated in 1103 and 1104. That is, the CPU 9 sets a region 1107, which is indicated by a dotted line, as a final target region.

Further, for example, if an image 1110 illustrated in FIG. 11B is obtained, first, the CPU 9 specifies a region 1111, which is indicated by a dashed line, as a temporary target region and then detects an aggregate 1112 of a plurality of rectangles specific to a keyboard. Then, the CPU 9 sets one of the horizontal sides of the target region inside the detected object, as illustrated in 1108. That is, the CPU 9 sets a region 1109, which is indicated by a dotted line, as a final target region.

Further, for example, if an image 1114 illustrated in FIG. 11C is obtained, first, the CPU 9 specifies a region 1116, which is indicated by a dashed line, as a temporary target region and then detects an aggregate 1113 of a plurality of rectangles in three horizontal rows×four vertical columns specific to a keyboard. Then, the CPU 9 sets one of the horizontal sides of the target region inside the detected object as illustrated in 1117. That is, the CPU 9 sets a region 1115, which is indicated by a dotted line, as a final target region.

For example, to detect a physical keyboard, not only an object corresponding to the size and the shape of a physical keyboard are detected, but also objects corresponding to characters indicated on a physical keyboard are detected, whereby it is possible to improve the accuracy of detection.

Figure 15A:
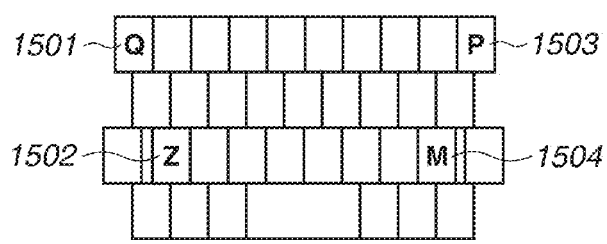
FIGS. 15A and 15B are diagrams illustrating physical keyboards included in a terminal apparatus.
Figure 15B:
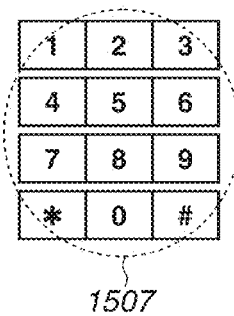

For example, generally, predetermined engraved marks are provided on the keys of a physical keyboard based on the JIS layout included in the terminal apparatus 801 corresponding to FIG. 11B. For example, as illustrated in FIG. 15A, an engraved mark "Q" is provided on a key 1501 in an upper left end portion. An engraved mark "Z" is provided on a key 1502 in a lower left end portion. An engraved mark "P" is provided on a key 1503 in an upper right end portion. An engraved mark "M" is provided on a key 1504 in a lower right end portion. Thus, if not only an object corresponding to the size and the shape of a physical keyboard, but also these engraved marks (characters) are detected, it is determined that an object corresponding to a physical keyboard is included. Thus, it is possible to further improve the accuracy of detection of an object. On a numeric-keypad-type physical keyboard, as illustrated in FIG. 15B, numbers "1" to "9" are engraved such that three numbers are engraved in each of three rows, and further, characters "*", "0", and "#" are engraved on the bottom row. These engraved marks are detected, whereby it is possible to further improve the accuracy of detection of an object.

The setting method for setting a final target region is not limited to a method for reducing the target region as described above. Alternatively, for example, an object may be detected as described above, thereby specifying the model of the terminal apparatus 801 placed on the document platen 802. Then, a value corresponding to the size of the display device of the specified model may be set as a final target region. In this case, for example, the MFP 1 has a table for specifying the size of the display device of the terminal apparatus 801 of the model corresponding to the type or the position of the detected object. Consequently, using this table, the MFP 1 can uniquely determine a final target region according to the type or the position of the detected object.

With such a form, it is possible to set, as a target region, a region having a size and a shape closer to the size and the shape of a region corresponding to a self-light-emitting unit, and more accurately perform the orientation determination process.

A detection method for detecting a registered object is specifically described. In the present exemplary embodiment, as an example of the detection method for detecting an object, a method termed template matching is described. Alternatively, another general detection method is also applicable.

In the present exemplary embodiment, the MFP 1 holds, in a memory such as the ROM 10, tables regarding registered objects as illustrated in FIGS. 13 and 16. In the tables, information of the type and the number of figures corresponding to an object number and characters corresponding to an object number is stored.

For example, a line 1302 in the table illustrated in FIG. 13 indicates that the object number "1" corresponds to a single round A. Further, a line 1303 indicates that the object number "3" corresponds to 26 rectangles A. Further, a line 1602 in the table illustrated in FIG. 16 indicates that the object number "1" corresponds to characters "Q", "P", "Z", and "M". Further, information 1601 indicates at which position in an object corresponding to a physical keyboard detected based on the table illustrated in FIG. 13 each character is present. The CPU 9 determines whether the objects corresponding to the information stored in these tables are included in a light-emission-present mode image.

Figure 14:
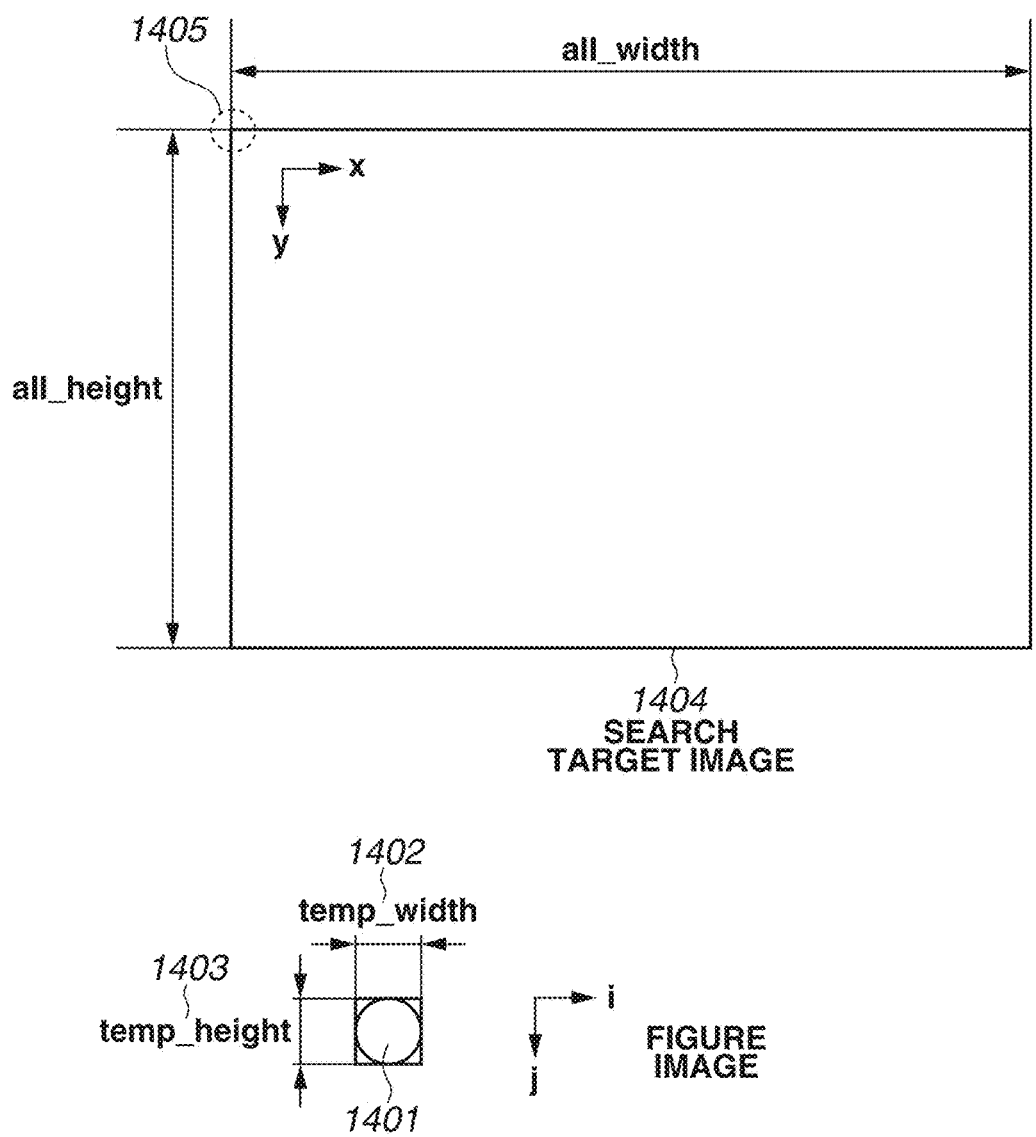
FIG. 14 is a diagram illustrating template matching.

FIG. 14 is a diagram illustrating template matching applicable to the present exemplary embodiment. Generally, a method for, to determine whether a certain object is included in a certain image, superimposing the image and the object and examining the similarity between the image and the object is termed matching. Further, matching between a template formed from an object based on the feature and the pixel value of an image set in advance, and an input image is termed template matching.

At this time, a round 1401 illustrated in FIG. 14 is defined as a registered object. That is, the MFP 1 holds information such as a width (temp_width) 1402 and a height (temp_height) 1403 as image information of the round 1401. The CPU 9 moves a template formed from the object from an initial position 1405 on a search target image 1404 (an image read in the light-emission-present mode), thereby searching for the object. As a method for determining whether the registered object is included in this range, a general method using the sum of squares or the sum of absolute values of the differences between the degrees of similarity or the degrees of difference between two images may be used.

FIG. 12 is a flowchart illustrating a calculation process for calculating a target region according to the present exemplary embodiment. The processing illustrated in this flowchart is achieved by, for example, the CPU 9 loading a program stored in the ROM 10 into the RAM 11 and executing the program. Further, the processing illustrated in this flowchart is executed, for example, when the target region 902 is specified in the orientation determination process (step S1011) in the processing illustrated in the flowchart in FIG. 10.

First, in step S1201, the CPU 9 specifies, as a temporary target region, a region having the outermost boundary line in the image obtained in step S1010, i.e., a region corresponding to the entirety of the display surface of the terminal apparatus 801.

Next, in step S1202, the CPU 9 initializes (substitutes 0 for) the value of a counter N, which is information saved in the ROM 10.

Next, in step S1203, the CPU 9 determines whether the value set to the counter N exceeds the total number of registered objects. If the determination is YES (YES in step S1203), the CPU 9 considers that all the registered objects are subjected to the determination, and the processing proceeds to step S1207. In step S1207, the CPU 9 determines the currently set target region as a final target region. Then, based on the target region determined at this time, the CPU 9 makes the orientation determination. If, on the other hand, the determination is NO (NO in step S1203), the processing proceeds to step S1204.

In step S1204, the CPU 9 determines whether an N-th object in the registered objects is included in the image obtained in step S1010. In the present exemplary embodiment, the MFP 1 holds, in a memory such as the ROM 10, the table regarding the registered objects as illustrated in FIG. 13. In this table, information of the type and the number of figures corresponding to an object number is stored. For example, if the counter N is 1, the CPU 9 determines whether the single round A, which is a figure corresponding to object number "1", is included in the image obtained in step S1010. For another example, if the counter N is 3, the CPU 9 determines whether the 26 rectangles A, which are figures corresponding to object number "3", are included in the image obtained in step S1010. If detecting a region corresponding to a physical keyboard based on the table illustrated in FIG. 13, the CPU 9 may determine, based on the table illustrated in FIG. 16, whether predetermined character objects are included at predetermined positions in the region corresponding to the physical keyboard. If the determination is YES (YES in step S1204), the processing proceeds to step S1205. In step S1205, the CPU 9 resets the target region. If the determination is NO (NO in step S1204), the CPU 9 does not reset the target region, and the processing proceeds to step S1206.

In step S1205, the CPU 9 reduces the target region as described with reference to FIGS. 11A, 11B, and 11C and sets the reduced region as a temporary target region. If the object detected in step S1204 is located outside the temporary target region, the CPU 9 does not reset the target region. Further, in step S1204, the CPU 9 may not detect a registered object from the entirety of a light-emission-present mode image, but may detect a registered object from within the temporary target region.

In step S1206, the CPU 9 increments the value of the counter N and then executes the process of step S1203 again.

With such a form, even in a case where the shape of the region of the entirety of the display surface of the terminal apparatus 801 is greatly different from the shape of the display device of the terminal apparatus 801, it is possible to execute an appropriate orientation determination process.

A third exemplary embodiment is described below. In a case where an image corresponding to image data selected by the user is displayed on the display device, generally, the entirety of the image emits light itself. However, in a case where a black region is included in the image corresponding to the image data selected by the user, the black region does not emit light itself or emits light with a very small amount of luminescence. In the present exemplary embodiment, a description is given of a form in which even in a case where a black region is included in an image corresponding to image data selected by the user, it is possible to make an accurate orientation determination.

Figure 17A:
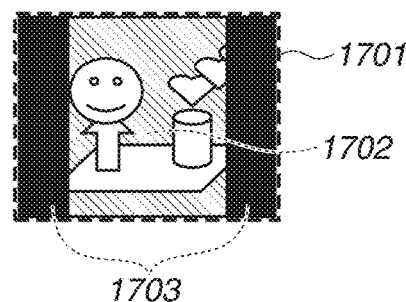
FIGS. 17A, 17B, and 17C are diagrams illustrating an image including a black region, and a terminal apparatus displaying the image.

FIG. 17A is a diagram illustrating an image corresponding to a single piece of image data selected by the user, and an image including a black region. A region 1701, which is indicated by a dashed line, is an image region corresponding to an image represented by image data selected by the user. The region 1701 includes regions 1702 and 1703. The region 1702 is a region that includes a color other than black and emits light itself in a case where the region is displayed on the display device of the terminal apparatus 801. The region 1703 is a region that does not emit light itself or emits light with a very small amount of luminescence, and is represented in black in a case where the region is displayed on the display device of the terminal apparatus 801. That is, in a case where the display surface of the terminal apparatus 801 in the state where the image illustrated in FIG. 17A is displayed on the display device is read in the light-emission-absent mode, an image that allows the identification of only the region 1702 is obtained. Hereinafter, in an image corresponding to a single piece of image data selected by the user, as in the region 1702, a region that strongly emits light itself and can be identified in an image read in the light-emission-absent mode will be referred to as a "self-light-emission region". Further, in an image corresponding to a single piece of image data selected by the user, as in the region 1703, a region that does not emit light itself or emits light with a very small amount of luminescence, and is represented in black is referred to as a "black region". In this case, the region 1701 is a horizontally long region, and the region 1702 included in the region 1701 is a vertically long region.

Figure 17B:
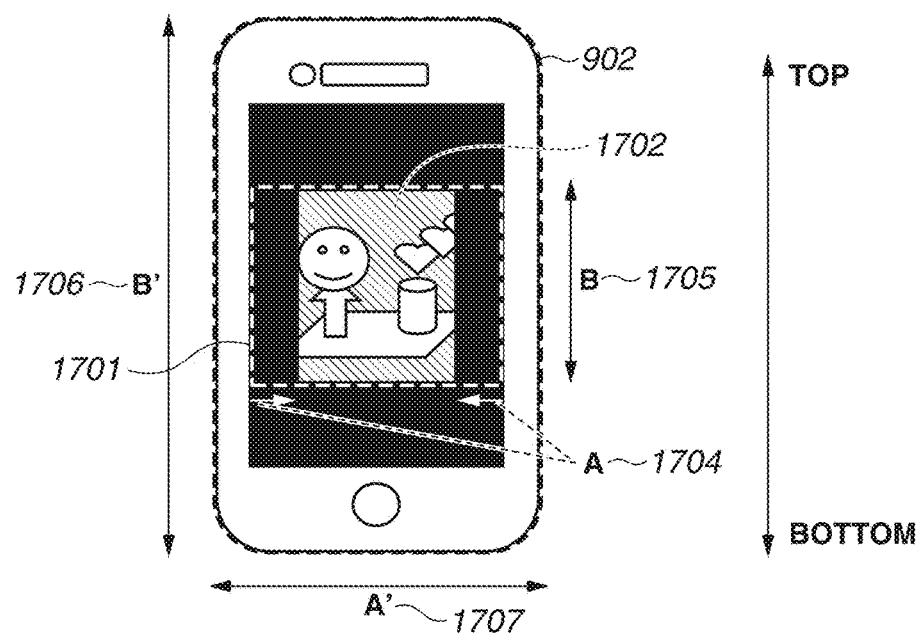
Figure 17C:
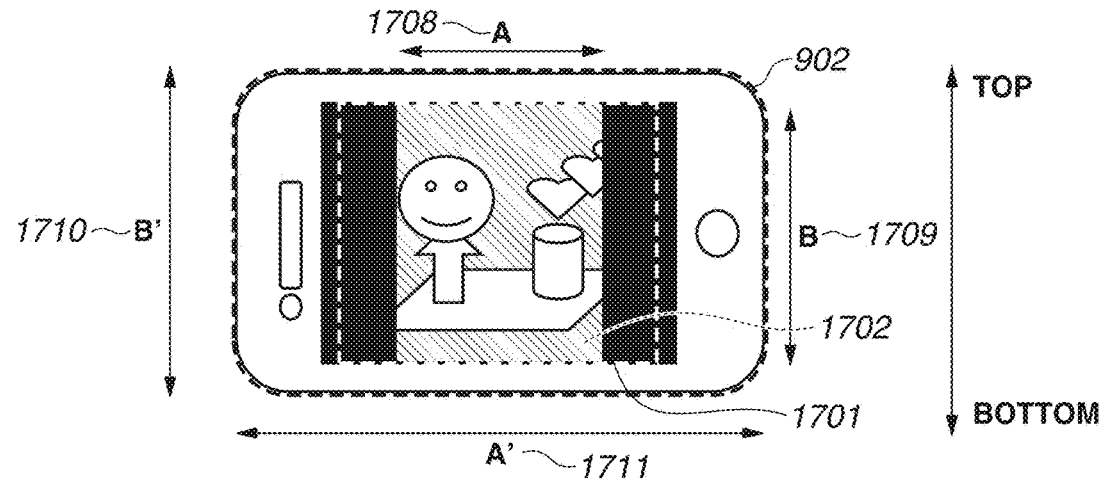

FIGS. 17B and 17C illustrate examples of the terminal apparatus 801 in the state where the image illustrated in FIG. 17A is displayed on the display device. FIG. 17B illustrates the state where the terminal apparatus 801 is vertically oriented. FIG. 17C illustrates the state where the terminal apparatus 801 is horizontally oriented. In FIG. 17B, a length 1707 in the horizontal direction of the entirety of the display surface in the state where the terminal apparatus 801 is vertically oriented is A'. A length 1706 in the vertical direction of the entirety of the display surface in the state where the terminal apparatus 801 is vertically oriented is B'. The size of the entirety of the display surface corresponds to the size of the target region 902 when the terminal apparatus 801 is read in the light-emission-present mode. Further, a length 1704 in the horizontal direction of the region 1702 in the state where the terminal apparatus 801 is vertically oriented is A. A length 1705 in the vertical direction of the region 1702 in the state where the terminal apparatus 801 is vertically oriented is B. Further, in FIG. 17C, a length 1711 in the horizontal direction of the entirety of the display surface in the state where the terminal apparatus 801 is horizontally oriented is A'. A length 1710 in the vertical direction of the entirety of the display surface in the state where the terminal apparatus 801 is horizontally oriented is B'. Further, a length 1708 in the horizontal direction of the region 1702 in the state where the terminal apparatus 801 is horizontally oriented is A. A length 1709 in the vertical direction of the region 1702 in the state where the terminal apparatus 801 is horizontally oriented is B. The size of the region 1702 corresponds to the size of a region that can be identified when the terminal apparatus 801 is read in the light-emission-absent mode.

As illustrated in FIG. 17B, in a case where the image illustrated in FIG. 17A is displayed on the display device in the state where the terminal apparatus 801 is vertically oriented, the aspect ratio of the target region 902 and the aspect ratio of the region 1702 exhibit similar tendencies. That is, if B'/A'<1, B/A<1. If B'/A'≥1, B/A≥1. Further, as illustrated in FIG. 17C, in a case where the image illustrated in FIG. 17A is displayed on the display device in the state where the terminal apparatus 801 is horizontally oriented, the aspect ratio of the target region 902 and the aspect ratio of the region 1702 do not exhibit similar tendencies. That is, if B'/A'<1, B/A≥1. If B'/A'≥1, B/A<1.

In a case where the entirety of an image corresponding to image data selected by the user is a self-light-emission region, and if the aspect ratio of the target region and the aspect ratio of the self-light-emission region exhibit similar tendencies, the self-light-emission region is displayed such that the self-light-emission region is larger. However, in a case where the entirety of an image corresponding to image data selected by the user is not a self-light-emission region, and as illustrated in FIGS. 17B and 17C, if the aspect ratio of the target region and the aspect ratio of the self-light-emission region do not exhibit similar tendencies, the self-light-emission region may be larger. That is, in a case where the aspect ratio of the entirety of an image corresponding to image data selected by the user and the aspect ratio of a self-light-emission region included in the image are different from each other, and if the aspect ratio of the target region and the aspect ratio of the self-light-emission region do not exhibit similar tendencies, the self-light-emission region is displayed such that the self-light-emission region is larger.

In response, in the present exemplary embodiment, a description is given of a form in which even in a case where a black region is included in an image region, it is possible to make an appropriate orientation determination.

Figure 18:
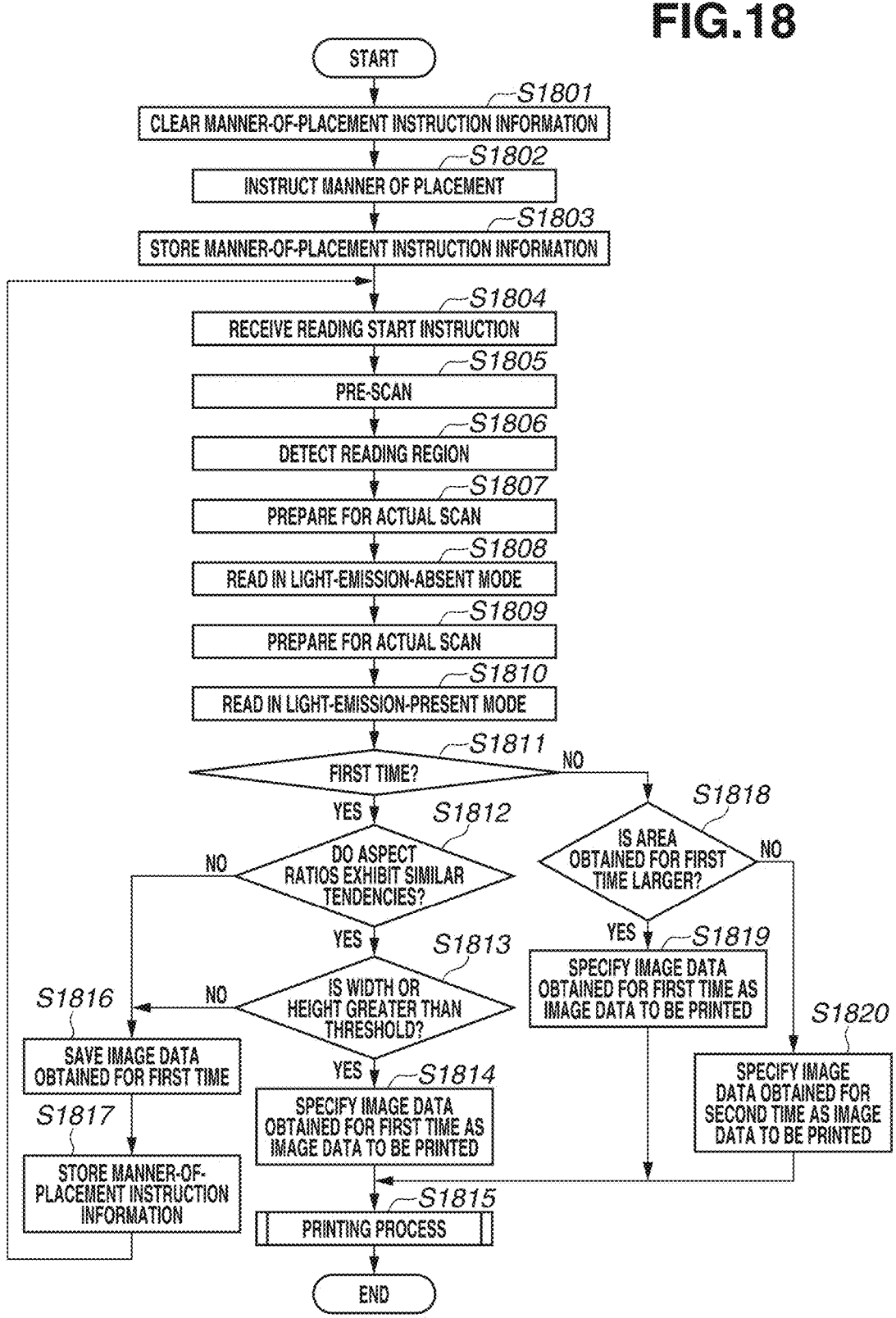
FIG. 18 is a flowchart illustrating processing executed by a reading control apparatus.

FIG. 18 is a flowchart illustrating processing executed by the MFP 1 in the present exemplary embodiment. The processing illustrated in this flowchart is achieved by, for example, the CPU 9 loading a program stored in the ROM 10 into the RAM 11 and executing the program. Further, the processing illustrated in this flowchart is started, for example, in a case where the user gives an instruction to execute the scanning process or the copying process in the self-emitted-light reading target reading mode. Further, processes similar to the processes illustrated in FIG. 10 are not described here.

Steps S1801 to S1810 are similar to steps S1001 to S1010, and therefore are not described here. Also in the present exemplary embodiment, similarly to the second exemplary embodiment, the target region may be reduced. In a case where the terminal apparatus 801 is read in the state where an image including a black region is displayed on the display device, then in step S1808, not an image that allows the identification of the entirety of the image region but an image that allows the identification of only a self-light-emission region in the image region is obtained.

In step S1811, the CPU 9 determines whether the reading in the light-emission-absent mode is performed for the first time. If the determination is YES (YES in step S1811), the processing proceeds to step S1812. If the determination is NO (NO in step S1811), the processing proceeds to step S1818.

In step S1812, the CPU 9 calculates the aspect ratio of the target region and the aspect ratio of the self-light-emission region from the images obtained in steps S1808 and S1810 and determines whether the aspect ratios exhibit similar tendencies. If the determination is YES (YES in step S1812), the processing proceeds to step S1813. Further, if the determination is NO (NO in step S1812), there is a possibility that the orientation of the display image relative to the orientation of the terminal apparatus 801 is not correct. Thus, first, the processing proceeds to step S1816. In step S1816, the CPU 9 saves the image data obtained in step S1808 in a storage area such as the RAM 11. Then, in step S1817, the CPU 9 indicates to the user a manner of placement that has not yet been indicated. Then, the CPU 9 executes the process of step S1804 again.

In step S1813, the CPU 9 determines whether the terminal apparatus 801 is placed on the document platen 802 so that the self-light-emission image is displayed such that the self-light-emission image is larger. As illustrated in FIG. 8C or 17C, if the self-light-emission image is displayed such that the self-light-emission image is larger, the self-light-emission image is enlarged to a size corresponding to the width and the height of the display device. Thus, this determination can be achieved by determining whether the self-light-emission image is enlarged to a size corresponding to the width and the height of the display device. Thus, the CPU 9 determines whether the width or the height of the self-light-emission region exceeds a predetermined threshold. The comparison target and the predetermined threshold change according to the orientation of the display image relative to the orientation of the terminal apparatus 801. The CPU 9 can know the state of the orientation of the display image relative to the orientation of the terminal apparatus 801, for example, by referencing manner-of-placement instruction information.

Figure 8A:
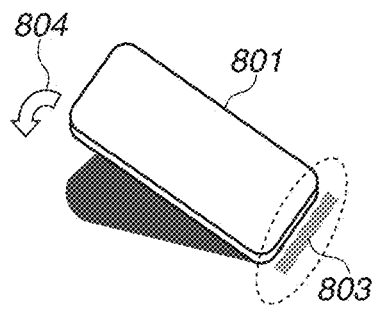
FIGS. 8A, 8B, 8C, and 8D are diagrams illustrating relationships between methods for placing a terminal apparatus on a document platen of the reading control apparatus, and images displayed in a case where a top-bottom direction of the terminal apparatus is changed.
Figure 8B:
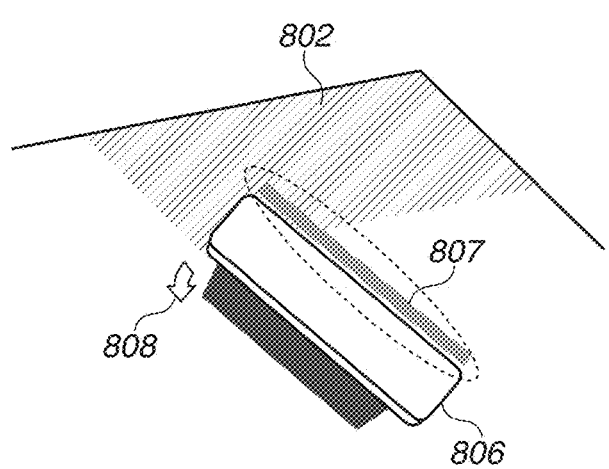
Figure 8C:
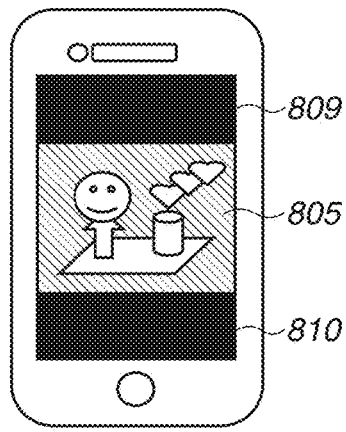
Figure 8D:
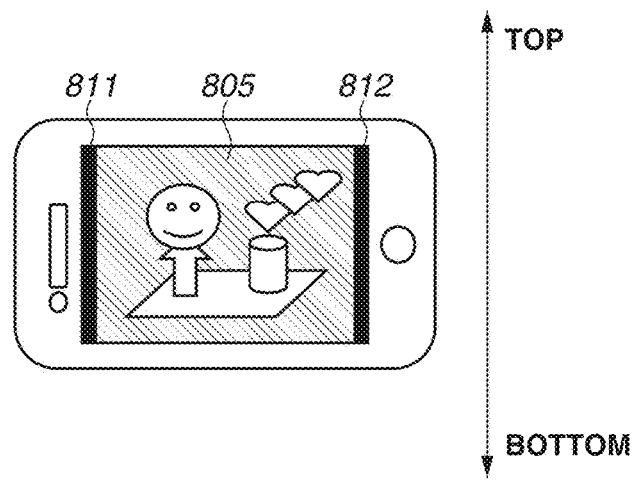

If the orientation of the terminal apparatus 801 and the orientation of the display image are the same as each other, i.e., if the reading is performed in the state where the manner of placement illustrated in FIG. 8A is instructed, the CPU 9 sets the comparison target to the width A of the self-light-emission region and sets the predetermined threshold to a value based on the width A' of the target region. Further, if the orientation of the terminal apparatus 801 and the orientation of the display image are not the same as each other, i.e., if the reading is performed in the state where the manner of placement illustrated in FIG. 8B is instructed, the CPU 9 sets the comparison target to the height B of the self-light-emission region and sets the predetermined threshold to a value based on the width B' of the target region. Actually, the width and the height of the target region are often greater than the width and the height of the display device. Thus, the predetermined threshold is appropriately set based on how to set the target region. For example, the predetermined threshold is set to a value obtained by the width B' of the target region×0.9.

This determination may also be achieved by determining whether the area of the self-light-emission region exceeds a predetermined threshold. This is because in the state where a black region is not included in the display image, and the orientation of the display image relative to the orientation of the terminal apparatus 801 is correct, the self-light-emission region is enlarged to a certain fixed size (e.g., the entirety of the display device). In this case, the predetermined threshold is set to, for example, a value based on the area of the target region. Actually, the area of the target region is often larger than the area of the display device. Thus, the predetermined threshold is appropriately set based on how to set the target region.

If the determination is YES (YES in step S1813), the processing proceeds to step S1814. In step S1814, the CPU 9 specifies, as image data to be subjected to a printing process, the image data obtained by the reading in the light-emission-absent mode performed for the first time. In step S1815, the CPU 9 prints the specified image data. Alternatively, according to processing for which an instruction has been given by the user, the CPU 9 may save, in a predetermined storage area, image data obtained not by printing but by, for example, scanning, or may transmit the image data to a predetermined external apparatus. Further, if the determination is NO (NO in step S1813), there is a possibility that the orientation of the display image relative to the orientation of the terminal apparatus 801 is not correct. Thus, first, the processing proceeds to step S1816. In step S1816, the CPU 9 saves the image data obtained in step S1808 in a storage area such as the RAM 11. Then, in step S1817, the CPU 9 instructs the user of a manner of placement that has not yet been instructed. Then, the CPU 9 executes the process of step S1804 again.

After the process of step S1804 is executed again, the determination is NO in step S1811, and the processing proceeds to step S1818.

In step S1818, the CPU 9 compares the area of the self-light-emission region obtained by the reading performed in the light-emission-absent mode for the first time, with the area of the self-light-emission region obtained by the reading in the light-emission-absent mode performed for the second time, thereby determining which area is larger. If it is determined that the area of the self-light-emission region obtained by the reading performed in the light-emission-absent mode for the first time is larger (YES in step S1818), the processing proceeds to step S1819. In step S1819, the CPU 9 specifies, as image data to be subjected to a printing process, the image data obtained by the reading in the light-emission-absent mode performed for the first time. If, on the other hand, it is determined that the area of the self-light-emission region obtained by the reading in the light-emission-absent mode performed for the second time is larger (NO in step S1818), the processing proceeds to step S1820. In step S1820, the CPU 9 specifies, as image data to be subjected to a printing process, the image data obtained by the reading in the light-emission-absent mode performed for the second time. Then, the processing proceeds to step S1815. In step S1815, the CPU 9 performs processing based on the image data specified in step S1819 or S1820.

With such a form, even in a case where a black region is included in an image corresponding to image data selected by the user, the MFP 1 can make an accurate orientation determination.

OTHER EXEMPLARY EMBODIMENTS

The details of the determination process for determining whether a self-emitted-light reading target is placed on the document platen in the maximum display state is not limited to the above form. For example, the determination may be made by simply acquiring an image region from an image obtained in the light-emission-absent mode and comparing the size of the image region with a threshold. In this case, for example, if the size of the image region is less than or equal to the threshold, it is determined that a self-emitted-light reading target is not placed on the document platen in the maximum display state. If the size of the image region is larger than the threshold, it is determined that a self-emitted-light reading target is placed on the document platen in the maximum display state. Alternatively, for example, the determination may be made by acquiring a region, such as the regions 809 and 810, other than the image region 805 on the display device and displayed in black from an image obtained in the light-emission-present mode and comparing the size of the region with a threshold. In this case, for example, if the size of the region is less than or equal to the threshold, it is determined that a self-emitted-light reading target is placed on the document platen in the maximum display state. If the size of the region is larger than the threshold, it is determined that a self-emitted-light reading target is not placed on the document platen in the maximum display state.

The present invention can also be achieved by the process of supplying a program for achieving one or more functions of the above exemplary embodiments to a system or an apparatus via a network or various storage media, and of causing a computer (a CPU or a microprocessor unit (MPU)) of the system or the apparatus to read and execute the program. Further, the program may be executed by a single computer, or may be executed by the cooperation of a plurality of computers. Further, not all the above processing needs to be achieved by software, and part or all of the processing may be achieved by hardware such as an application-specific integrated circuit (ASIC). Further, the present invention is not limited to the form in which a single CPU performs all the processing. Alternatively, the form may be such that a plurality of CPUs appropriately cooperates to perform processing. Yet alternatively, the form may be such that a single CPU executes any of the above processing, and a plurality of CPUs cooperates to perform the rest of the processing.

The present invention is directed to improving convenience for a user when a reading device is caused to read a display surface of a terminal apparatus having the function of changing the size of an image to be displayed on a display device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-208186, filed Oct. 24, 2016, which is hereby incorporated by reference herein in its entirety.

What is claimed is:

1. A reading control apparatus comprising
   a reading unit configured to cause a reading device to read a region including an image displayed on a display device of a terminal apparatus,
   wherein the display device operates in a first state where the display device displays an image in a first size, or a second state where the display device displays the image in a second size smaller than the first size,
   wherein the reading unit is configured to execute a first reading process for causing the reading device to read a region including the display device without causing a light-emitting unit for emitting light to emit light to the display device, thereby acquiring data corresponding to the region read by the reading device;
   wherein the reading unit is configured to execute a second reading process for causing the reading device to read the region including the display device while causing the light-emitting unit to emit light to the display device, thereby acquiring data corresponding to the region read by the reading device;
   the reading control apparatus comprising:
   a reception unit configured to receive an execution instruction to execute reading using the reading device;
   a determination unit configured to execute a determination process for determining whether the display device operates in the first state or in the second state based on the data acquired by executing the first reading process and the data acquired by executing the second reading process; and
   a notification unit configured to, in a case where the execution instruction is received, and a determination result of the determination process indicates that the display device operates in the second state, execute a notification process for notifying a user of a message for prompting the user to cause the display device to operate in the first state.

2. The reading control apparatus according to claim 1, wherein in a case where the execution instruction is received, and the determination result of the determination process indicates that the display device operates in the first state, the notification process is not executed.

3. The reading control apparatus according to claim 1, further comprising:
   a first specifying unit configured to specify, from an image represented by the data obtained by the first reading process, an image region corresponding to a self-light-emission region, which is a region corresponding to a part that emits light itself in the region including the display device; and a second specifying unit configured to specify, from an image represented by the image data obtained by the second reading process, an image region corresponding to a target region, which is a region outside the self-light-emission region, wherein the determination process is executed based on the image region corresponding to the self-light-emission region and the image region corresponding to the target region.

4. The reading control apparatus according to claim 3, wherein in the determination process, it is determined whether an aspect ratio of the image region corresponding to the target region is smaller than a first threshold, and whether an aspect ratio of the image region corresponding to the self-light-emission region is smaller than the first threshold, and wherein in a case where both the aspect ratio of the image region corresponding to the target region and the aspect ratio of the image region corresponding to the self-light-emission region are smaller than the first threshold, and in a case where both the aspect ratio of the image region corresponding to the target region and the aspect ratio of the image region corresponding to the self-light-emission region are equal to or greater than the first threshold, the determination result of the determination process indicates that the display device operates in the first state, and in a case where only either one of the aspect ratio of the image region corresponding to the target region and the aspect ratio of the image region corresponding to the self-light-emission region is smaller than the first threshold, and in a case where only either one of the aspect ratio of the image region corresponding to the target region and the aspect ratio of the image region corresponding to the self-light-emission region is greater than the first threshold, the determination result of the determination process indicates that the display device does not operate in the first state.

5. The reading control apparatus according to claim 4, wherein in a case where both the aspect ratio of the image region corresponding to the target region and the aspect ratio of the image region corresponding to the self-light-emission region are smaller than the first threshold, and in a case where both the aspect ratio of the image region corresponding to the target region and the aspect ratio of the image region corresponding to the self-light-emission region are equal to or greater than the first threshold, it is further determined whether a width of the image region corresponding to the self-light-emission region is greater than a second threshold based on a width of the image region corresponding to the target region, or whether a height of the image region corresponding to the self-light-emission region is greater than a third threshold based on a height of the image region corresponding to the target region, and wherein in a case where it is determined that the width of the image region corresponding to the self-light-emission region is greater than the second threshold, or the height of the image region corresponding to the self-light-emission region is greater than the third threshold, the determination result of the determination process indicates that the display device operates in the first state, and in a case where it is determined that the width of the image region corresponding to the self-light-emission region is not greater than the second threshold, or in a case where the height of the image region corresponding to the self-light-emission region is not greater than the third threshold, the determination result of the determination process indicates that the display device does not operate in the first state.

6. The reading control apparatus according to claim 3, wherein the target region is a region corresponding to an entirety of a display surface of the terminal apparatus, which is a surface including the display device, or is a region corresponding to the display device.

7. The reading control apparatus according to claim 3, further comprising:
  a detection unit configured to detect a predetermined object from the image represented by the data obtained by the second reading process; and
  a reduction unit configured to, in a case where the predetermined object is detected, reduce the specified image region corresponding to the target region according to a position where the predetermined object is detected,
  wherein the determination process is executed based on a size of the reduced image region corresponding to the target region, and a size of the image region corresponding to the self-light-emission region.

8. The reading control apparatus according to claim 7, wherein in a case where the predetermined object is detected, a predetermined character is detected from the image represented by the data obtained by the second reading process, and
  wherein in a case where the predetermined object and the predetermined character are detected, the specified image region corresponding to the target region is reduced according to a position where the predetermined object is detected.

9. The reading control apparatus according to claim 1, further comprising:
  a target specifying unit configured to specify whether the reading device is to read the region including the image displayed on the display device, or the reading device is to read a reading target not including a display device; and
  a control unit configured to, in a case where it is specified that the reading device is to read the region including the image displayed on the display device, perform control so that the first reading process and the second reading process are executed, and in a case where it is specified that the reading device is to read a target not including a display device, perform control so that the first reading process is executed, and the second reading process is not executed.

10. The reading control apparatus according to claim 1, wherein as the notification process, a process of prompting the user to change a manner of placing the terminal apparatus placed on a document platen and place the terminal apparatus on the document platen again is executed.

11. The reading control apparatus according to claim 1, further comprising an instruction unit configured to instruct a manner of placing the terminal apparatus on a document platen before the display device is read by the reading device,
  wherein as the notification process, a process of instructing the user of a manner of placement other than a manner of placement already instructed by the instruction unit is executed.

12. The reading control apparatus according to claim 1, wherein as the notification process, a process of prompting the user to enlarge the image displayed on the display device is executed.

13. The reading control apparatus according to claim 1, wherein as the notification process, a process of displaying, on a display device included in the reading control apparatus, a screen for notifying the user that the terminal apparatus placed on a document platen is not in the first state is executed.

14. The reading control apparatus according to claim 1, further comprising a processing unit configured to, in a case where the display device operates in the first state, execute a process based on data obtained by the reading device, and in a case where the display device does not operate in the first state, not execute the process based on the data obtained by the reading device,
wherein the process based on the data obtained by the reading device is at least one of a process of executing printing based on the data obtained by the reading device, a process of saving in a predetermined storage area the data obtained by the reading device, and a process of transmitting the data obtained by the reading device to an external apparatus of the reading control apparatus.

15. The reading control apparatus according to claim 1, further comprising:
a processing unit configured to execute a process based on data obtained by the reading device; and
an accepting unit configured to, in a case where the display device does not operate in the first state, accept from the user an execution instruction to execute a process based on data obtained by the reading device reading the display device not operating in the first state, or a stop instruction not to execute the process based on the data obtained by the reading device reading the display device not operating in the first state,
wherein in a case where the execution instruction is accepted, the process based on the data obtained by the reading device reading the display device not operating in the first state is executed, and in a case where the stop instruction is accepted, the process based on the data obtained by the reading device reading the display device not operating in the first state is not executed, and
wherein the process based on the data obtained by the reading device is at least one of a process of executing printing based on the data obtained by the reading device, a process of saving in a predetermined storage area the data obtained by the reading device, and a process of transmitting the data obtained by the reading device to an external apparatus of the reading control apparatus.

16. The reading control apparatus according to claim 1, further comprising a processing unit configured to execute a particular process based on, between an image region corresponding to a self-light-emission region, which is a region specified from an image represented by data obtained by the reading device before the notification is given, and corresponding to a part that emits light itself in a region including the display device, and the image region corresponding to the self-light-emission region specified from an image represented by data obtained by the reading device, image data corresponding to the image region corresponding to the self-light-emission region having a larger area,
wherein the particular process is at least one of a process of executing printing based on the data obtained by the reading device, a process of saving in a predetermined storage area the data obtained by the reading device, and a process of transmitting the data obtained by the reading device to an external apparatus of the reading control apparatus.

17. A control method for controlling a reading control apparatus having a reading unit including a reading device, the control method comprising
causing the reading device to read a region including an image displayed on a display device of a terminal apparatus,
wherein the display device operates in a first state where the display device displays an image in a first size, or a second state where the display device displays the image in a second size smaller than the first size,
wherein the reading unit executes a first reading process for causing the reading device to read a region including the display device without causing a light-emitting unit for emitting light to emit light to the display device, thereby acquiring data corresponding to the region read by the reading device;
wherein the reading unit executes a second reading process for causing the reading device to read the region including the display device while causing the light-emitting unit to emit light to the display device, thereby acquiring data corresponding to the region read by the reading device;
the control method comprising:
receiving an execution instruction to execute reading using the reading device;
executing a determination process for determining whether the display device operates in the first state or in the second state based on the data acquired by executing the first reading process and the data acquired by executing the second reading process; and
in a case where the execution instruction is received, and a determination result of the determination process indicates that the display device operates in the second state, executing a notification process for notifying a user of a message for prompting the user to cause the display device to operate in the first state.

18. A non-transitory computer-readable storage medium having stored therein a program for causing a computer of a reading control apparatus having a reading unit including a reading device, to execute:
causing the reading device to read a region including an image displayed on a display device of a terminal apparatus,
wherein the display device operates in a first state where the display device displays an image in a first size, or a second state where the display device displays the image in a second size smaller than the first size,
wherein the reading unit executes a first reading process for causing the reading device to read a region including the display device without causing a light-emitting unit for emitting light to emit light to the display device, thereby acquiring data corresponding to the region read by the reading device;
wherein the reading unit executes a second reading process for causing the reading device to read the region including the display device while causing the light-emitting unit to emit light to the display device, thereby acquiring data corresponding to the region read by the reading device;
the program causing the computer to execute:
receiving an execution instruction to execute reading using the reading device;
determining whether the display device operates in the first state or in the second state based on the data acquired by executing the first reading process and the data acquired by executing the second reading process; and in a case where the execution instruction is received, and a determination result of the determination process indicates that the display device operates in the second state, executing a notification process for notifying a user of a message for urging the user to cause the display device to operate in the first state.

\* \* \* \* \*